US012786978B2

(12) United States Patent
Zhang

(10) Patent No.: US 12,786,978 B2
(45) Date of Patent: Nov. 3, 2026

(54) COMMUNICATION METHOD, APPARATUS, AND SYSTEM, AND STORAGE MEDIUM

(71) Applicant: HUAWEI TECHNOLOGIES CO., LTD., Shenzhen (CN)

(72) Inventor: Di Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 534 days.

(21) Appl. No.: 17/948,570

(22) Filed: Sep. 20, 2022

(65) Prior Publication Data

US 2023/0023281 A1 Jan. 26, 2023

Related U.S. Application Data

(63) Continuation of application No. PCT/CN2020/080512, filed on Mar. 20, 2020.

(51) Int. Cl.

*H04W 72/044* (2023.01)
*H04W 16/28* (2009.01)
*H04W 72/1268* (2023.01)
*H04W 80/02* (2009.01)

(52) U.S. Cl.

CPC ......... *H04W 72/046* (2013.01); *H04W 16/28* (2013.01); *H04W 72/1268* (2013.01); *H04W 80/02* (2013.01)

(58) Field of Classification Search

None

See application file for complete search history.

(56) References Cited

U.S. PATENT DOCUMENTS

| | | | | |
|---|---|---|---|---|
| 2018/0242381 | A1* | 8/2018 | Wei | H04W 40/22 |
| 2019/0281588 | A1 | 9/2019 | Zhang et al. | |
| 2020/0053586 | A1* | 2/2020 | Kim | H04W 88/06 |
| 2020/0314860 | A1* | 10/2020 | Zhou | H04W 72/23 |

FOREIGN PATENT DOCUMENTS

| | | | |
|---|---|---|---|
| CN | 110535601 | A | 12/2019 |
| CN | 110831173 | A | 2/2020 |
| CN | 110859008 | A | 3/2020 |

OTHER PUBLICATIONS

Ericsson ("Remaining details of beam management", 3GPP Tsg Ran WG1 Meeting #92bis, R1-1804974, Apr. 16 - 20, 2018, pp. 1-13) (Year: 2018).*

(Continued)

*Primary Examiner* — Wei Zhao
*Assistant Examiner* — Nhu Pham
(74) *Attorney, Agent, or Firm* — Rimon PC

(57) ABSTRACT

Embodiments of this application provide a communication method, apparatus, and system, and a storage medium. The method includes the steps of: sending first indication information, where the first indication information is used to configure a candidate spatial parameter information set of a first uplink channel; and sending second indication information, where the second indication information indicates at least one piece of first spatial parameter information in the candidate spatial parameter information set. The at least one piece of first spatial parameter information is used to transmit a second uplink channel and/or an uplink signal. The first uplink channel and the second uplink channel are of different types.

10 Claims, 6 Drawing Sheets

(56) References Cited

OTHER PUBLICATIONS

Qualcomm Incorporated, "Design of MIMO DL MAC CE", 3GPP TSG-RAN WG2 Meeting #109 electronic R2-2001034, Feb. 24-Mar. 6, 2020; 10 total pages.
3GPP TSG RAN Meeting #86, RP-193133, "New WID: Further enhancements on MIMO for NR", Samsung, Sitges, Spain, Dec. 9-12, 2019; 5 total pages.
Ericsson: "Remaining details of beam management", 3GPP Draft; R1-1804974,Apr. 7, 2018, pp. 1-13, XP051414297.
3GPP TS 38.331 V15.8.0 (Dec. 2019), 3rd Generation Partnership Project; Technical Specification Group Radio Access Network; NR; Radio Resource Control (RRC) protocol specification (Release 15), total 529 pages.

* cited by examiner

<table>
<tr><td>R</td><td colspan="5">Serving cell ID</td><td colspan="2">BWP ID</td><td>Byte 1</td></tr>
<tr><td>R</td><td colspan="7">PUCCH resource ID</td><td>Byte 2</td></tr>
<tr><td>$S_7$</td><td>$S_6$</td><td>$S_5$</td><td>$S_4$</td><td>$S_3$</td><td>$S_2$</td><td>$S_1$</td><td>$S_0$</td><td>Byte 3</td></tr>
</table>

FIG. 3

<table>
<tr><td>A/D</td><td colspan="5">ID of a serving cell to which an SRS resource set belongs</td><td colspan="2">ID of a BWP to which the SRS resource set belongs</td><td>Byte 1</td></tr>
<tr><td>R</td><td>R</td><td>C</td><td>SUL</td><td colspan="4">SP SRS resource set ID</td><td>Byte 2</td></tr>
<tr><td>$F_0$</td><td colspan="7">Resource $ID_0$</td><td>Byte 3</td></tr>
</table>

...

<table>
<tr><td>$F_{M-1}$</td><td colspan="7">Resource $ID_{M-1}$</td><td>Byte N−M</td></tr>
<tr><td>R</td><td colspan="5">Resource serving cell $ID_0$</td><td colspan="2">Resource BWP $ID_0$</td><td>Byte N−M+1</td></tr>
</table>

...

<table>
<tr><td>R</td><td colspan="5">Resource serving cell $ID_{M-1}$</td><td colspan="2">Resource BWP $ID_{M-1}$</td><td>Byte N</td></tr>
</table>

FIG. 4

| | | | | | | | | |
|---|---|---|---|---|---|---|---|---|
| R | Serving cell ID | | | | | BWP ID | | Byte 1 |
| R | R | SRS resource ID | | | | | | Byte 2 |
| R | R | PUCCH-spatial relation information ID | | | | | | Byte 3 |

COMMUNICATION METHOD, APPARATUS, AND SYSTEM, AND STORAGE MEDIUM

CROSS-REFERENCE TO RELATED APPLICATIONS

This application is a continuation of International Application No. PCT/CN2020/080512, filed on Mar. 20, 2020, which is hereby incorporated by reference in its entirety.

TECHNICAL FIELD

Embodiments of this application generally relate to communication technologies, and in particular, to a communication method, apparatus, and system, and a storage medium.

BACKGROUND

With development of intelligent terminal devices, the bandwidth requirement of a terminal device increases explosively, and it is difficult for a current spectrum resource to satisfy the bandwidth requirement of the terminal device. Therefore, higher frequency bands (for example, a millimeter-wave band) with wider available bandwidth are becoming candidate frequency bands in a 5G communication system. In addition, the combined size of the antennas configured for a terminal device can be further greatly reduced using the high frequency band, to facilitate obtaining of the location address of the terminal device and deployment of more antennas. However, when a signal is transmitted by using the high frequency band, a radio transmission loss of the signal is increased, and the impact of those factors such as atmosphere and vegetation on the signal especially aggravates the loss.

To use the high frequency band, a signal transmission mechanism based on a beamforming (beamforming) technology is introduced to a communication system, to compensate for the loss in a signal transmission process by increasing an antenna gain. Because a signal transmitted based on the beamforming technology has specific directionality, to track the change of a formed beam in the signal transmission process, channel quality measurement based on the beamforming technology is introduced to the 5G communication system, so that a network device can obtain information about a better beam between the terminal device and the network device.

Currently, the network device may indicate, to the terminal device by using spatial parameter information, beam information used to transmit an uplink channel and/or an uplink signal, so that the terminal device performs transmission using the beam information. However, when indicating beam information for different uplink channels and uplink signals, the network device needs to use different spatial parameter information indication mechanisms. Consequently, implementing beam information transmission between the network device and the terminal device is difficult.

SUMMARY

Embodiments of this application provide a communication method, apparatus, and system, and a storage medium, to resolve a technical problem that implementation complexity between a network device and a terminal device is high because the network device needs to use different spatial parameter information indication mechanisms to indicate beam information for different uplink channels and uplink signals.

According to a first aspect, an embodiment of this application provides a communication method. The method may be applied to a network device, or may be applied to a chip in the network device. The following describes the method by using an example in which the method is applied to the network device.

In the method, the network device may send first indication information, where the first indication information is used to configure a candidate spatial parameter information set of a first uplink channel. Then, the network device may send second indication information, where the second indication information indicates at least one piece of first spatial parameter information in the candidate spatial parameter information set, the at least one piece of first spatial parameter information is used to transmit a second uplink channel and/or an uplink signal, and the first uplink channel and the second uplink channel are of different types.

In a possible implementation, the method may further include: The network device receives the second uplink channel and/or the uplink signal based on the at least one piece of first spatial parameter information.

In a possible implementation, the first uplink channel is an uplink control channel.

In a possible implementation, the uplink signal is a sounding reference signal (SRS).

In a possible implementation, the second uplink channel is an uplink data channel.

Spatial parameter information in a spatial parameter set configured for the first uplink channel is indicated for use by the second uplink channel and/or the uplink signal, so that a same spatial parameter information indication mechanism can indicate the spatial parameter information, and implementation complexity between the network device and a terminal device is simplified.

In a possible implementation, the second indication information may be carried in a first media access control (MAC) control element (CE) (MAC CE). In this manner, implementations and application scenarios of the solution may be extended.

Optionally, a logical channel identifier of the first MAC CE and a logical channel identifier of a preset MAC CE are the same but have different formats. For example, the first MAC CE and the preset MAC CE each include a first field, and the first field indicates that a MAC CE to which the first field belongs is the first MAC CE or the preset MAC CE. For another example, before sending the second indication information, the network device may send third indication information, where the third indication information includes a second field, and a value of the second field is associated with a format of a MAC CE. In this implementation, at least one piece of spatial parameter information can be indicated by reusing an existing MAC CE, without adding new signaling. This simplifies implementation.

For example, the preset MAC CE indicates second spatial parameter information, and the second spatial parameter information is used to transmit the uplink signal. In this implementation, the at least one piece of spatial parameter information can be indicated by reusing an existing MAC CE indicating the spatial parameter information for the uplink signal, without adding new signaling. This facilitates implementation.

In another possible implementation, the second indication information is carried in a first information field in downlink control information. In this implementation, at least one piece of spatial parameter information can be indicated by using the downlink control information, without adding new signaling. This facilitates implementation.

Optionally, an identifier of the at least one piece of first spatial parameter information is associated with a code point of the first information field. In this implementation, the at least one piece of first spatial parameter information can be indicated by using a small quantity of bits, thereby reducing signal overheads used to transmit indication information.

Optionally, before sending the second indication information or when sending the second indication information, the network device may send fourth indication information, where the fourth indication information includes a third field, and a value of the third field is associated with the first information field. In this implementation, the at least one piece of spatial parameter information can be indicated by reusing existing downlink control information. This simplifies implementation.

In a possible implementation, the network device may further send fifth indication information, where the fifth indication information indicates the second uplink channel and/or the uplink signal associated with the second indication information. In this manner, signaling overheads for indicating the spatial parameter information can be further reduced.

In a possible implementation, the second indication information further indicates to transmit the first uplink channel by using the at least one piece of first spatial parameter information. In this manner, signaling overheads for indicating the spatial parameter information can be further reduced. In a moving scenario, beam switching is frequently performed. In this manner, beam information can be quickly communicated to the terminal device, thereby improving indication efficiency. In this way, the terminal device may quickly complete beam switching, and avoid link interruption.

In a possible implementation, the second indication information further indicates that the at least one piece of first spatial parameter information is used to transmit a downlink channel and/or a downlink signal. In this manner, signaling overheads for indicating the spatial parameter information can be further reduced. In a moving scenario, beam switching is frequently performed. In this manner, beam information can be quickly communicated to the terminal device, thereby improving indication efficiency. In this way, the terminal device may quickly complete beam switching, and avoid link interruption.

According to a second aspect, an embodiment of this application provides a communication method. The method may be applied to a network device, or may be applied to a chip in the network device. The following describes the method by using an example in which the method is applied to the network device.

In the method, the network device may send first indication information, where the first indication information is used to configure a candidate spatial parameter information set of a first uplink channel. Then, the network device may send second indication information, where the second indication information indicates at least one piece of spatial parameter information, the at least one piece of spatial parameter information is used to transmit a plurality of second uplink channels with a same identifier in a frequency band list, the at least one piece of spatial parameter information belongs to the candidate spatial parameter information set, and the first uplink channel belongs to the plurality of second uplink channels.

In a possible implementation, the method may further include: The network device receives the plurality of second uplink channels based on the at least one piece of spatial parameter information.

In a possible implementation, the plurality of second uplink channels are uplink control channels.

Spatial parameters in the spatial parameter set configured for the first uplink channel are indicated for use by a plurality of uplink channels of a same type, so that one piece of signaling can be used to simultaneously indicate spatial parameters used to transmit the plurality of uplink channels, to reduce signaling overheads and improve communication efficiency.

In a possible implementation, the method may further include: The network device sends third indication information, where the third indication information indicates the frequency band list. Alternatively, the frequency band list is any one of the following lists: a frequency band list used to update spatial parameter information of a plurality of sounding reference signals SRSs; a frequency band list used to update spatial parameter information of a plurality of downlink data channels; a frequency band list used to update spatial parameter information of a plurality of downlink control channels; or the like. For example, the frequency band list is a carrier list or a bandwidth part list.

In a possible implementation, the second indication information is carried in a media access control control element (MAC CE) or radio resource control (RRC) signaling. In this manner, implementations and application scenarios of the solution may be extended.

According to a third aspect, an embodiment of this application provides a communication method. The method may be applied to a terminal device, or may be applied to a chip in the terminal device. The following describes the method by using an example in which the method is applied to the terminal device.

In the method, the terminal device may receive first indication information, where the first indication information is used to configure a candidate spatial parameter information set of a first uplink channel. Then, the terminal device may receive second indication information, where the second indication information indicates at least one piece of first spatial parameter information in the candidate spatial parameter information set, the at least one piece of first spatial parameter information is used to transmit a second uplink channel and/or an uplink signal, and the first uplink channel and the second uplink channel are of different types.

In a possible implementation, the method may further include: The terminal device sends the second uplink channel and/or the uplink signal based on the at least one piece of first spatial parameter information.

In a possible implementation, the first uplink channel is an uplink control channel.

In a possible implementation, the uplink signal is an SRS.

In a possible implementation, the second uplink channel is an uplink data channel.

In a possible implementation, the second indication information may be carried in a first MAC CE.

Optionally, a logical channel identifier of the first MAC CE and a logical channel identifier of a preset MAC CE are the same but have different formats. For example, the first MAC CE and the preset MAC CE each include a first field, and the first field indicates that a MAC CE to which the first field belongs is the first MAC CE or the preset MAC CE. For another example, before receiving the second indication information, the terminal device may receive third indication information, where the third indication information includes a second field, and a value of the second field is associated with a format of a MAC CE. Then, the terminal device may determine, based on the value of the second field, whether a to-be-received MAC CE is the first MAC CE.

For example, the preset MAC CE indicates second spatial parameter information, and the second spatial parameter information is used to transmit the uplink signal.

In another possible implementation, the second indication information is carried in a first information field in downlink control information.

Optionally, an identifier of the at least one piece of first spatial parameter information is associated with a code point of the first information field.

Optionally, before receiving the second indication information or when receiving the second indication information, the terminal device may receive fourth indication information, where the fourth indication information includes a third field, and a value of the third field is associated with the first information field. Then, the terminal device may determine, based on the value of the third field, whether to-be-received downlink control information carries the first information field.

In a possible implementation, the method may further include: The terminal device receives fifth indication information, where the fifth indication information indicates the second uplink channel and/or the uplink signal associated with the second indication information.

In a possible implementation, the second indication information further indicates to the terminal device to transmit the first uplink channel by using the at least one piece of first spatial parameter information.

In a possible implementation, the second indication information further indicates that the at least one piece of first spatial parameter information is used to transmit a downlink channel and/or a downlink signal.

For beneficial effects of the communication method provided in the third aspect and the possible implementations of the third aspect, refer to the beneficial effects brought by the first aspect and the possible implementations of the first aspect. Details are not described herein again.

According to a fourth aspect, an embodiment of this application provides a communication method. The method may be applied to a terminal device, or may be applied to a chip in the terminal device. The following describes the method by using an example in which the method is applied to the terminal device.

In the method, the terminal device may receive first indication information, where the first indication information is used to configure a candidate spatial parameter information set of a first uplink channel. Then, the terminal device may receive second indication information, where the second indication information indicates at least one piece of spatial parameter information, the at least one piece of spatial parameter information is used to transmit a plurality of second uplink channels with a same identifier in a frequency band list, the at least one piece of spatial parameter information belongs to the candidate spatial parameter information set, and the first uplink channel belongs to the plurality of second uplink channels.

In a possible implementation, the method may further include: The terminal device sends the plurality of second uplink channels based on the at least one piece of first spatial parameter information.

In a possible implementation, the plurality of second uplink channels are uplink control channels.

In a possible implementation, the method may further include: The terminal device receives third indication information, where the third indication information indicates the frequency band list. Alternatively, the frequency band list comprises one of the following lists: a frequency band list used to update spatial parameter information of a plurality of sounding reference signals SRSs; a frequency band list used to update spatial parameter information of a plurality of downlink data channels; a frequency band list used to update spatial parameter information of a plurality of downlink control channels; or the like. For example, the frequency band list is a carrier list or a bandwidth part list.

In a possible implementation, the second indication information is carried in a MAC CE or RRC signaling.

For beneficial effects of the communication method provided in the fourth aspect and the possible implementations of the fourth aspect, refer to the beneficial effects brought by the second aspect and the possible implementations of the second aspect. Details are not described herein again.

According to a fifth aspect, an embodiment of this application provides a communication apparatus. The communication apparatus may include a sending module, for example, implemented on one or more processing circuits and/or a transceiver. Optionally, in some embodiments, the communication apparatus may further include a processing module and a receiving module. In some embodiments, the processing module is implemented on one or more processors or processing circuits, and the receiving module is implemented on one or more processing circuits and/or a transceiver.

The sending module is configured to send first indication information, where the first indication information is used to configure a candidate spatial parameter information set of a first uplink channel. The sending module is further configured to send second indication information, where the second indication information indicates at least one piece of first spatial parameter information in the candidate spatial parameter information set, the at least one piece of first spatial parameter information is used to transmit a second uplink channel and/or an uplink signal, and the first uplink channel and the second uplink channel are of different types.

In a possible implementation, the processing module is configured to receive the second uplink channel and/or the uplink signal based on the at least one piece of first spatial parameter information by using the receiving module.

In a possible implementation, the first channel is an uplink control channel.

In a possible implementation, the uplink signal is an SRS.

In a possible implementation, the second channel is an uplink data channel.

In a possible implementation, the second indication information may be carried in a first MAC CE.

Optionally, a logical channel identifier of the first MAC CE and a logical channel identifier of a preset MAC CE are the same but have different formats. For example, the first MAC CE and the preset MAC CE each include a first field, and the first field indicates that a MAC CE to which the first field belongs is the first MAC CE or the preset MAC CE. For another example, before sending the second indication information, the sending module is further configured to send third indication information, where the third indication information includes a second field, and a value of the second field is associated with a format of a MAC CE.

For example, the preset MAC CE indicates second spatial parameter information, and the second spatial parameter information is used to transmit the uplink signal.

In another possible implementation, the second indication information is carried in a first information field in downlink control information.

Optionally, an identifier of the at least one piece of first spatial parameter information is associated with a code point of the first information field.

Optionally, before sending the second indication information or when sending the second indication information, the sending module is further configured to send fourth indication information, where the fourth indication information includes a third field, and a value of the third field is associated with the first information field.

In a possible implementation, the sending module is further configured to send fifth indication information, where the fifth indication information indicates the second uplink channel and/or the uplink signal associated with the second indication information.

In a possible implementation, the second indication information further indicates to transmit the first uplink channel by using the at least one piece of first spatial parameter information.

In a possible implementation, the second indication information further indicates that the at least one piece of first spatial parameter information is used to transmit a downlink channel and/or a downlink signal.

For beneficial effects of the communication apparatus provided in the fifth aspect and the possible implementations of the fifth aspect, refer to the beneficial effects brought by the first aspect and the possible implementations of the first aspect. Details are not described herein again.

According to a sixth aspect, an embodiment of this application provides a communication apparatus. The communication apparatus may include a sending module, for example, implemented on one or more processing circuits and/or a transceiver. Optionally, in some embodiments, the communication apparatus may further include a processing module and a receiving module. In some embodiments, the processing module is implemented on one or more processors or processing circuits, and the receiving module is implemented on one or more processing circuits and/or a transceiver.

The sending module is configured to send first indication information, where the first indication information is used to configure a candidate spatial parameter information set of a first uplink channel. The sending module is further configured to send second indication information, where the second indication information indicates at least one piece of spatial parameter information, the at least one piece of spatial parameter information is used to transmit a plurality of second uplink channels with a same identifier in a frequency band list, the at least one piece of spatial parameter information belongs to the candidate spatial parameter information set, and the first uplink channel belongs to the plurality of second uplink channels.

In a possible implementation, the processing module is configured to receive the plurality of second uplink channels based on the at least one piece of spatial parameter information by using the receiving module.

In a possible implementation, the plurality of second uplink channels are all uplink control channels.

In a possible implementation, the sending module is further configured to send third indication information, where the third indication information indicates the frequency band list. Alternatively, the frequency band list comprises one of the following lists: a frequency band list used to update spatial parameter information of a plurality of sounding reference signals SRSs; a frequency band list used to update spatial parameter information of a plurality of downlink data channels; a frequency band list used to update spatial parameter information of a plurality of downlink control channels; or the like. For example, the frequency band list is a carrier list or a bandwidth part list.

In a possible implementation, the second indication information is carried in a MAC CE or RRC signaling.

For beneficial effects of the communication apparatus provided in the sixth aspect and the possible implementations of the sixth aspect, refer to the beneficial effects brought by the second aspect and the possible implementations of the second aspect. Details are not described herein again.

According to a seventh aspect, an embodiment of this application provides a communication apparatus. The communication apparatus may include a receiving module. Optionally, in some embodiments, the communication apparatus may further include a processing module and a sending module.

The receiving module is configured to receive first indication information, where the first indication information is used to configure a candidate spatial parameter information set of a first uplink channel. The receiving module is further configured to receive second indication information, where the second indication information indicates at least one piece of first spatial parameter information in the candidate spatial parameter information set, the at least one piece of first spatial parameter information is used to transmit a second uplink channel and/or an uplink signal, and the first uplink channel and the second uplink channel are of different types.

In a possible implementation, the processing module is configured to send the second uplink channel and/or the uplink signal based on the at least one piece of first spatial parameter information by using the sending module.

In a possible implementation, the first uplink channel is an uplink control channel.

In a possible implementation, the uplink signal is an SRS.

In a possible implementation, the second uplink channel is an uplink data channel.

In a possible implementation, the second indication information may be carried in a first MAC CE.

Optionally, a logical channel identifier of the first MAC CE and a logical channel identifier of a preset MAC CE are the same but have different formats. For example, the first MAC CE and the preset MAC CE each include a first field, and the first field indicates that a MAC CE to which the first field belongs is the first MAC CE or the preset MAC CE. For another example, before receiving the second indication information, the receiving module is further configured to receive third indication information, where the third indication information includes a second field, and a value of the second field is associated with a format of a MAC CE. The processing module is further configured to determine, based on the value of the second field, whether a to-be-received MAC CE is the first MAC CE.

For example, the preset MAC CE indicates second spatial parameter information, and the second spatial parameter information is used to transmit the uplink signal.

In another possible implementation, the second indication information is carried in a first information field in downlink control information.

Optionally, an identifier of the at least one piece of first spatial parameter information is associated with a code point of the first information field.

Optionally, before receiving the second indication information or when receiving the second indication information, the receiving module is further configured to receive fourth indication information, where the fourth indication information includes a third field, and a value of the third field is associated with the first information field. The processing module is further configured to determine, based on the value of the third field, whether to-be-received downlink control information carries the first information field.

In a possible implementation, the receiving module is further configured to receive fifth indication information, where the fifth indication information indicates the second uplink channel and/or the uplink signal associated with the second indication information.

In a possible implementation, the second indication information further indicates to transmit the first uplink channel by using the at least one piece of first spatial parameter information.

In a possible implementation, the second indication information further indicates that the at least one piece of first spatial parameter information is used to transmit a downlink channel and/or a downlink signal.

For beneficial effects of the communication apparatus provided in the seventh aspect and the possible implementations of the seventh aspect, refer to the beneficial effects brought by the first aspect and the possible implementations of the first aspect. Details are not described herein again.

According to an eighth aspect, an embodiment of this application provides a communication apparatus. The communication apparatus may include a receiving module. Optionally, in some embodiments, the communication apparatus may further include a processing module and a sending module.

The receiving module is configured to receive first indication information, where the first indication information is used to configure a candidate spatial parameter information set of a first uplink channel. The receiving module is further configured to receive second indication information, where the second indication information indicates at least one piece of spatial parameter information, the at least one piece of spatial parameter information is used to transmit a plurality of second uplink channels with a same identifier in a frequency band list, the at least one piece of spatial parameter information belongs to the candidate spatial parameter information set, and the first uplink channel belongs to the plurality of second uplink channels.

In a possible implementation, the processing module is configured to send the plurality of second uplink channels based on the at least one piece of first spatial parameter information by using the sending module.

In a possible implementation, the plurality of second uplink channels are uplink control channels.

In a possible implementation, the receiving module is further configured to receive third indication information, where the third indication information indicates the frequency band list. Alternatively, the frequency band list comprises one of the following lists: a frequency band list used to update spatial parameter information of a plurality of sounding reference signals SRSs; a frequency band list used to update spatial parameter information of a plurality of downlink data channels; a frequency band list used to update spatial parameter information of a plurality of downlink control channels; or the like. For example, the frequency band list is a carrier list or a bandwidth part list.

In a possible implementation, the second indication information is carried in a MAC CE or RRC signaling.

For beneficial effects of the communication apparatus provided in the eighth aspect and the possible implementations of the eighth aspect, refer to the beneficial effects brought by the second aspect and the possible implementations of the second aspect. Details are not described herein again.

According to a ninth aspect, an embodiment of this application provides a communication apparatus. The communication apparatus includes a processor and a memory.

The memory is configured to store computer-executable program code, and the program code includes instructions; and when the processor executes the instructions, the instructions enable the communication apparatus to perform the method described in any one of the first aspect.

According to a tenth aspect, an embodiment of this application provides a communication apparatus. The communication apparatus includes a processor and a memory.

The memory is configured to store computer-executable program code, and the program code includes instructions; and when the processor executes the instructions, the instructions enable the communication apparatus to perform the method described in any one of the second aspect.

According to an eleventh aspect, an embodiment of this application provides a communication apparatus. The communication apparatus includes a processor, a memory, a transmitter, and a receiver, where both the receiver and the transmitter are coupled to the processor, and the processor controls a receiving action of the receiver and controls a sending action of the transmitter. The memory is configured to store computer-executable program code, and the program code includes instructions; and when the processor executes the instructions, the instructions enable the communication apparatus to perform the method described in any one of the third aspect.

According to a twelfth aspect, an embodiment of this application provides a communication apparatus. The communication apparatus includes a processor, a memory, a transmitter, and a receiver, where both the receiver and the transmitter are coupled to the processor, and the processor controls a receiving action of the receiver and controls a sending action of the transmitter. The memory is configured to store computer-executable program code, and the program code includes instructions; and when the processor executes the instructions, the instructions enable the communication apparatus to perform the method described in any one of the fourth aspect.

According to a thirteenth aspect, an embodiment of this application provides a communication apparatus. The communication apparatus includes the network device described in the first aspect, the network device described in the second aspect, the terminal device described in the third aspect, or the terminal device described in the fourth aspect.

According to a fourteenth aspect, an embodiment of this application provides a communication system. The communication system may include the network device described in the first aspect and the terminal device described in the third aspect; the network device described in the second aspect and the terminal device described in the fourth aspect; the communication apparatus described in the fifth aspect and the communication apparatus described in the seventh aspect; the communication apparatus described in the sixth aspect and the communication apparatus described in the eighth aspect; the communication apparatus described in the ninth aspect and the communication apparatus described in the eleventh aspect; the communication apparatus described in the tenth aspect and the communication apparatus described in the twelfth aspect; or the communication apparatus described in the thirteenth aspect.

According to a fifteenth aspect, an embodiment of this application provides a chip. The chip stores a computer program, and when the computer program is executed by the chip, the method described in any one of the first aspect to the fourth aspect is implemented.

According to a sixteenth aspect, an embodiment of this application provides a communication apparatus, including a unit, a module, or a circuit configured to perform the method provided in the first aspect or the possible implementations of the first aspect, or the method provided in the second aspect or the possible implementations of the second aspect. The communication apparatus may be a network device, or may be a module used in the network device, for example, may be a chip used in the network device.

According to an eighteenth aspect, an embodiment of this application provides a communication apparatus, including a unit, a module, or a circuit configured to perform the method provided in the third aspect or the possible implementations of the third aspect, or the method provided in the fourth aspect or the possible implementations of the fourth aspect. The communication apparatus may be a terminal device, or may be a module used in the terminal device, for example, may be a chip used in the terminal device.

According to a nineteenth aspect, an embodiment of this application provides a computer-readable storage medium, configured to store a computer program or instructions. When the computer program or the instructions are run on a computer, the computer is enabled to perform the method described in any one of the first aspect to the fourth aspect.

According to a twentieth aspect, an embodiment of this application provides a computer program product. When the computer program product runs on a computer, the computer is enabled to perform the method described in any one of the first aspect to the fourth aspect.

According to a twenty-first aspect, an embodiment of this application provides a computer program product including instructions. When the computer program product runs on a computer, the computer is enabled to perform the method described in any one of the first aspect to the fourth aspect.

BRIEF DESCRIPTION OF DRAWINGS

FIG. 3 shows a format of a MAC CE;

FIG. 4 shows a format of another MAC CE;

DESCRIPTION OF EMBODIMENTS

The following first describes an architecture of a communication system to which embodiments of this application is applicable.

Embodiments of this application may be applied to various communication systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a $5^{th}$ generation (5G) mobile communication system or a new radio (NR) system, and a future communication system (for example, a $6^{th}$ generation mobile communication system). The 5G mobile communication system described in embodiments of this application may include a non-standalone (non-standalone, NSA) 5G mobile communication system and/or a standalone (SA) 5G mobile communication system. Alternatively, the communication system to which embodiments of this application is applicable may be a public land mobile communication network (PLMN), a device-to-device (D2D) network, a machine to machine (M2M) network, an internet of things (IoT) network, or another network.

Figure 1:
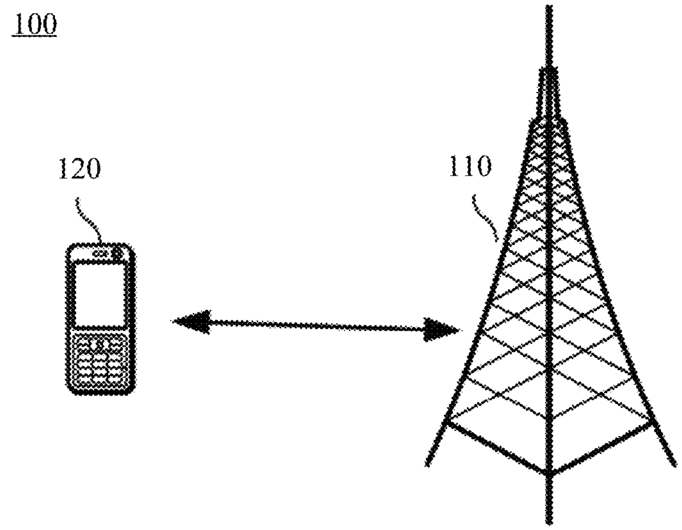
FIG. 1 is a schematic diagram of an architecture of a communication system to which an embodiment of this application is applicable.

FIG. 1 is a schematic diagram of an architecture of a communication system to which an embodiment of this application is applicable. As shown in FIG. 1, the communication system 100 may include a network device 110 and a terminal device 120. The network device 110 communicates with the terminal device 120 by using a wireless network. The terminal device may be located at a fixed location, or may be mobile.

The terminal device in embodiments of this application may be user equipment, an access terminal, a subscriber unit, a subscriber station, a mobile station, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile communication network (PLMN), or the like. This is not limited in embodiments of this application.

By way of example but not limitation, in embodiments of this application, the terminal device may alternatively be a wearable device. The wearable device may also be referred to as a wearable intelligent device, and is a general term of wearable devices such as glasses, gloves, watches, clothes, and shoes that are developed by applying wearable technologies in intelligent designs of daily wear. The wearable device is a portable device that is directly worn on a body or integrated into clothes or an accessory of a user. The wearable device is more than a hardware device, and implements powerful functions through software support, data exchange, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bands or smart jewelry for monitoring physical signs.

In addition, in embodiments of this application, the terminal device may alternatively be a terminal device in an IoT network. IoT is an important part of future development of information technologies. A main technical feature of the IoT is connecting things to networks by using a communication technology, to implement an intelligent network for interconnection between a person and a machine or between things. In embodiments of this application, an IOT technology may implement massive connections, deep coverage, and terminal power saving by using, for example, a narrowband (NB) technology.

In addition, in embodiments of this application, the terminal device may further include a sensor, for example, an intelligent printer, a train detector, or a gas station. Main functions of the terminal device include collecting data (by some terminal devices), receiving control information and downlink data from the network device, sending an electromagnetic wave, and transmitting uplink data to the network device.

The network device in embodiments of this application may be a device configured to communicate with the terminal device, and is an access device used by the terminal device to access the mobile communication system in a wireless manner. The network device may be a base transceiver station (BTS) in the global system for mobile communications (GSM) or code division multiple access (CDMA) system, or may be a NodeB (NB) in the wideband code division multiple access (WCDMA) system, or may be an evolved NodeB (evolved NodeB, eNB or eNodeB) in the LTE system, or may be a radio controller in a cloud radio access network (CRAN) scenario. Alternatively, the network device may be a relay station, an access point, a vehicle-mounted device, a wearable device, a network device in the future 5G network, a network device in the future evolved PLMN network, or the like. This is not limited in embodiments of this application. In a network structure, the network device may include a centralized unit (CU) node, a distributed unit (distributed unit, DU) node, or a RAN device that includes the CU node and the DU node.

In embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems, for example, a Linux operating system, a Unix operating system, an Android operating system, an iOS operating system, or a Windows operating system, that implement service processing by using a process. The application layer includes applications such as a browser, an address book, word processing software, and instant messaging software. In addition, a specific structure of an execution body of a method provided in embodiments of this application is not specifically limited in embodiments of this application, provided that a program that records code of the method provided in embodiments of this application can be run to perform communication according to the method provided in embodiments of this application. For example, the method provided in embodiments of this application may be performed by the terminal device or the network device, or a function module that can invoke and execute the program in the terminal device or the network device.

In embodiments of this application, the network device and the terminal device may be deployed on the land, including an indoor device, an outdoor device, a handheld device, or a vehicle-mounted device; may be deployed on the water; or may be deployed on an airplane, a balloon, and a satellite in the air. Application scenarios of the network device and the terminal device are not limited in embodiments of this application.

Communication between the network device and the terminal device may be performed by using a licensed spectrum (licensed spectrum), may be performed by using an unlicensed spectrum (unlicensed spectrum), or may be performed by using both the licensed spectrum and the unlicensed spectrum. Communication between the network device and the terminal device may be performed by using a spectrum below 6 gigahertz (GHz), may be performed by using a spectrum above 6 GHz, or may be performed by using both the spectrum below 6 GHz and the spectrum above 6 GHz. A spectrum resource used between the network device and the terminal device is not limited in embodiments of this application.

When a transmit direction of the communication system 100 is uplink transmission, the terminal device 120 is a transmit end, and the network device 110 is a receive end. When the transmit direction of the communication system 100 is downlink transmission, the network device 110 is a transmit end, and the terminal device 120 is a receive end.

It should be understood that, the network device 110 in FIG. 1 may include one or more cells.

It should be understood that the technical solutions in embodiments of this application may be applied to a single-carrier or carrier aggregation (CA) scenario, a dual connectivity (DC) scenario, or a coordinated multipoint transmission/reception (CoMP) scenario. COMP may be one or more of a non-coherent joint transmission (NCJT) scenario, a coherent joint transmission (CJT) scenario, a joint transmission (JT) scenario, or the like.

For example, the communication system shown in FIG. 1 may be in the single-carrier scenario or the carrier aggregation (CA) scenario.

Figure 2:
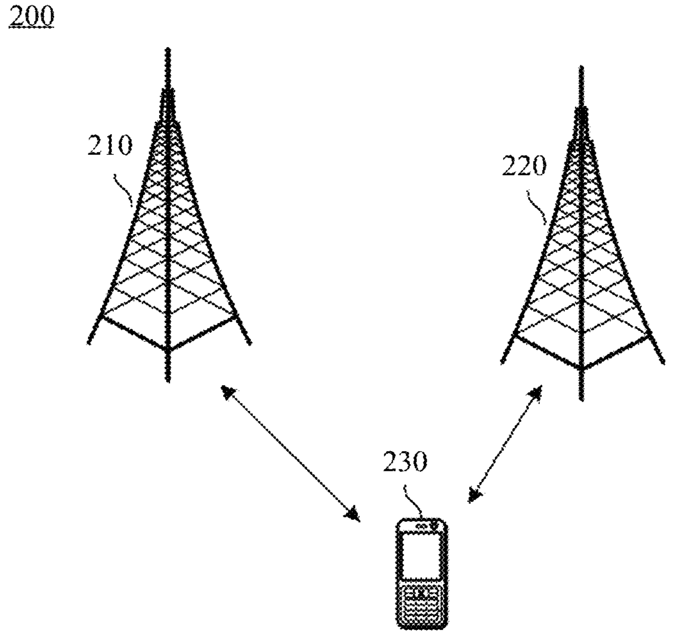
FIG. 2 is a schematic diagram of an architecture of another communication system to which an embodiment of this application is applicable.

FIG. 2 is a schematic diagram of an architecture of another communication system to which an embodiment of this application is applicable. As shown in FIG. 2, the communication system 200 is in the dual connectivity (DC) or coordinated multipoint transmission/reception (COMP) scenario. The communication system 200 includes a network device 210, a network device 220, and a terminal device 230. The network device 210 is a network device during initial access of the terminal device 230, and is responsible for RRC communication with the terminal device 230. The network device 220 is added during RRC reconfiguration, and is configured to provide an additional radio resource. The terminal device 230 for which carrier aggregation (CA) is configured is connected to the network device 210 and the network device 220. A link between the network device 210 and the terminal device 230 may be referred to as a first link, and a link between the network device 220 and the terminal device 230 may be referred to as a second link.

It should be understood that the communication systems shown in FIG. 1 and FIG. 2 are merely examples for description, and the communication system applicable to embodiments of this application is not limited thereto. For example, the communication system may further include another network device, for example, may further include a wireless relay device and a wireless backhaul device, which are not shown in FIG. 1 and FIG. 2. Quantities of network devices and terminal devices included in the communication system are not limited in embodiments of this application.

For ease of understanding embodiments of this application, terms in embodiments of this application are first described below.

1. Spatial Related Parameter Information

The spatial related parameter information may include quasi-collocation (QCL) information, and may further include spatial relation information. Usually, the QCL information indicates a spatial related parameter (which may also be referred to as a spatial related characteristic) of a downlink signal, and the spatial relation information indicates a spatial related parameter (which may also be referred to as a spatial related characteristic) of an uplink signal.

The uplink signal may include but is not limited to: a physical uplink control channel (PUCCH), a physical uplink shared channel (PUSCH), a sounding reference signal (SRS), a phase-tracking reference signal (PTRS), and a demodulation reference signal (DMRS).

The downlink signal may include but is not limited to: a physical downlink control channel (PDCCH), a physical downlink shared channel (PDSCH), a tracking reference signal (TRS), a channel state information reference signal (CSI-RS), a PTRS, a DMRS, and a synchronization signal broadcast channel block (SS/PBCH block). The SS/PBCH block may be referred to as a synchronization signal block (SSB) for short. The SSB includes one or more of the following: a primary synchronization signal (PSS), a secondary synchronization signal (SSS), and a PBCH. The SSB is a signal mainly used for cell searching, cell synchronization, and carrying broadcast information.

The spatial relation information is used to assist in describing transmit-side beamforming information and a transmission procedure of the terminal device.

The spatial relation information indicates a spatial sending parameter relationship between two reference signals. A target reference signal is usually an uplink signal, for example, may be a DMRS or an SRS. A referenced reference signal or a source reference signal may be usually a CSI-RS, an SRS, an SSB, or the like.

Quasi-collocation may also be referred to as quasi-co-site or collocation. The QCL information may also be referred to as QCL assumption information. The QCL information is used to assist in describing receive-side beamforming information and a receiving procedure of the terminal device.

The QCL information may indicate a QCL relationship between two reference signals. The target reference signal is usually a downlink signal, for example, may be a DMRS or a CSI-RS. The referenced reference signal or the source reference signal may be usually a CSI-RS, an SSB, a TRS, or the like. The TRS is also a type of CSI-RS.

The QCL information of the PDCCH is used as an example, and a method for configuring the QCL information of the PDCCH may be as follows:

K pieces of candidate QCL information of the PDCCH are configured. For example, the K pieces of candidate QCL information of the PDCCH are configured by using radio resource control (RRC) signaling, and the K pieces of candidate QCL information may be, for example, K TCI-states. K is an integer greater than or equal to 1.

The QCL information of the PDCCH is indicated. For example, when K is an integer greater than 1, the QCL information of the PDCCH is indicated by using a media access control (MAC) control element (CE) (MAC CE).

For example, it may be specified that in an initial radio resource control (RRC) phase and a media access control (MAC)-control element (CE) phase, the terminal device assumes that DMRSs of the PDCCH and the PDSCH and an SSB determined during initial access are QCLed.

Signals corresponding to antenna ports having a QCL relationship may have a same or similar spatial characteristic parameter (or referred to as a parameter). Alternatively, a spatial characteristic parameter (or referred to as a parameter) of one antenna port may be used to determine a spatial characteristic parameter (or referred to as a parameter) of another antenna port that has a QCL relationship with the antenna port. Alternatively, two antenna ports have a same or similar spatial characteristic parameter (or referred to as a parameter). Alternatively, a difference between spatial characteristic parameters (or referred to as parameters) of two antenna ports is less than a threshold.

It should be understood that spatial characteristic parameters of two reference signals or channels that satisfy a QCL relationship are the same (close or similar), so that a spatial characteristic parameter of the target reference signal can be inferred based on a resource index of the source reference signal.

It should be further understood that spatial characteristic parameters of two reference signals or channels that satisfy spatial relation information are the same (close or similar), so that a spatial characteristic parameter of the target reference signal can be inferred based on the resource index of the source reference signal.

The spatial characteristic parameter may include one or more of the following parameters: an angle of arrival (AoA), a dominant angle of arrival AoA, an average angle of arrival, a power angular spectrum (PAS) of the angle of arrival, an angle of departure (AoD), a dominant angle of departure, an average angle of departure, a power angular spectrum of the angle of departure, transmit beamforming of the terminal device, receive beamforming of the terminal device, a spatial channel correlation, transmit beamforming of the network device, receive beamforming of the network device, an average channel gain, an average channel delay, delay spread, Doppler spread, a Doppler shift, a spatial reception parameter (spatial Rx parameter), or the like.

The foregoing angles may be decomposition values at different dimensions or a combination of decomposition values at different dimensions. The antenna ports may be antenna ports having different antenna port numbers. Alternatively, the antenna ports may be antenna ports that have a same antenna port number or different antenna port numbers and that send or receive information at different time. Alternatively, the antenna ports may be antenna ports that have a same antenna port number or different antenna port numbers and that send or receive information at different frequencies. Alternatively, the antenna ports may be antenna ports that have a same antenna port number or different antenna port numbers and that send or receive information in different code domain resources.

The spatial characteristic parameters describe a characteristic of a spatial channel between an antenna port for the source reference signal and an antenna port for the target reference signal, and help the terminal device complete receive-side beamforming or a receiving processing process based on the QCL information. For example, the terminal device may receive the target reference signal based on receive beam information that is of the source reference signal and that is indicated by the QCL information. These spatial characteristic parameters further help the terminal device complete transmit-side beamforming or a transmitting processing process based on the spatial related information. For example, the terminal device may transmit the target reference signal based on transmit beam information of the source reference signal as indicated by the spatial related information.

To reduce overheads of transmitting the QCL information by the network device to the terminal device, in an optional implementation, the network device may indicate that a demodulation reference signal of the PDCCH or the PDSCH satisfies a QCL relationship to one or more of a plurality of reference signal resources previously reported by the terminal device. For example, the reference signal may be a CSI-RS. An index of each reported CSI-RS resource corresponds to one transmit-receive beam pair that is previously established during measurement performed based on the CSI-RS resource. It should be understood that receive beam information of two reference signals or channels that satisfy a QCL relationship is the same, and the terminal device may infer, based on a resource index of the reference signal, receive beam information for receiving the PDCCH or the PDSCH.

In the existing protocol, the QCL relationship may be classified into the following four types based on different parameters:

type A (type A): a Doppler shift, Doppler spread, an average delay, and delay spread;

type B (type B): the Doppler shift and the Doppler spread;

type C (type C): the Doppler shift and the average delay; and type D (type D): a spatial reception parameter (Spatial Rx parameter).

The network device may simultaneously configure one or more types of QCL for the terminal device, for example, QCL types A+D and QCL types C+D.

When the QCL relationship is a QCL relationship of the type D, the QCL relationship may be considered as spatial QCL. When antenna ports satisfy the spatial QCL relationship, the QCL relationship may be a QCL relationship (which is referred to as the spatial relation above) between a port for a downlink signal and a port for a downlink signal, or a QCL relationship between a port for an uplink signal and a port for an uplink signal. For example, a QCL relationship between a downlink signal and an uplink signal, or a QCL relationship between a port for an uplink signal and a port for a downlink signal may be that the two signals may have a same AOA or AOD, to indicate that the two signals have a same receive beam or transmit beam. For another example, a QCL relationship between a downlink signal and an uplink signal, or a QCL relationship between a port for an uplink signal and a port for a downlink signal may be that there is a correspondence between AOAs and AODs of the two signals, or that there is a correspondence between AODs and AOAs of the two signals. To be specific, beam reciprocity may be used to determine an uplink transmit beam based on a downlink receive beam or determine a downlink receive beam based on an uplink transmit beam.

From the perspective of a transmit end, if two antenna ports are spatially QCLed, it may mean that corresponding beam directions of the two antenna ports are consistent in space. From the perspective of a receive end, if two antenna ports are spatially QCLed, it may mean that the receive end can receive, in a same beam direction, signals sent through the two antenna ports.

Signals transmitted on ports having a spatial QCL relationship may further have corresponding beams. The corresponding beam may include at least one or more of the following: a same receive beam, a same transmit beam, a transmit beam corresponding to a receive beam (for example, which may correspond to a reciprocity scenario), and a receive beam corresponding to a transmit beam (for example, which may correspond to a reciprocity scenario).

The signals transmitted on the ports having a spatial QCL relationship may alternatively be understood as signals received or sent by using a same spatial filter (spatial filter). The spatial filter may be one or more of the following: precoding, a weight of an antenna port, phase deflection of the antenna port, or an amplitude gain of the antenna port.

The signals transmitted through the ports having a spatial QCL relationship may alternatively be understood as having corresponding beam pair links (BPLs). The corresponding BPL includes at least one or more of the following: a same downlink BPL, a same uplink BPL, an uplink BPL corresponding to a downlink BPL, or a downlink BPL corresponding to an uplink BPL.

Therefore, the spatial reception parameter (namely, the type D QCL) may be understood as a parameter indicating direction information of a receive beam.

In an example of this application, correspondences of some parameters may also be used in descriptions of a QCL scenario.

It should be understood that this application is applicable to a QCL assumption scenario in which two reference signals, or transmission objects may have an association relationship.

2. Transmission Configuration Indicator (TCI) State (TCI-State)

The TCI-state may indicate QCL information of a signal or a channel. The channel may be, for example, a PDCCH, a CORESET, or a PDSCH. The signal may be, for example, a CSI-RS, a DMRS, or a TRS. TCI information may mean that a reference signal included in a TCI and the channel satisfy a QCL relationship, and mainly indicates that during reception of the channel, information such as a spatial characteristic parameter of the channel is the same as, similar to, or close to information such as a spatial characteristic parameter of the reference signal included in the TCI. The TCI information may also mean that the reference signal included in the TCI and the signal satisfy a QCL relationship, and mainly indicates that during reception of the signal, information such as a spatial characteristic parameter of the signal is the same as, similar to, or close to information such as a spatial characteristic parameter of the reference signal included in the TCI.

It should be understood that, that the reference signal included in the TCI and the channel satisfy a QCL relationship may be described as follows: The reference signal included in the TCI and a DMRS of the channel satisfy a QCL relationship.

One or more referenced reference signals and an associated QCL type may be configured for one TCI-state. In other words, configuration information of one TCI-state may include identifiers of one or two reference signal resources and an associated QCL type. The QCL type may further be classified into four categories: type A, type B, type C, and type D, which are different combinations or selections of {Doppler shift, Doppler spread, average delay, delay spread, and spatial Rx parameter}. The TCI-state includes the QCL information, or the TCI-state indicates the QCL information.

The TCI-state is configured by the network device for each terminal device. The following is a format of the TCI-state.

```
TCI-State ::=          SEQUENCE {
   tci-StateId            TCI-StateId,
   qcl-Type1              QCI-Info,
   qcl-Type2              QCI-Info
OPTIONAL,              --Need R
   ...
  }
QCI-Info ::=           SEQUENCE {
   cell                    ServCellIndex
OPTIONAL,              --Need R
   bwp-Id                  BWP-Id
OPTIONAL,              --Need R
   referenceSignal         CHOICE{
      csi-rs                  NZP-CSI-RS-ResourceSetId
      ssb                     SSB-Index
   }
   qcl-Type                ENUMERATED{typeA,TypeB,TypeC,TypeD},
   ...
}
```

In addition, the TCI-state may be globally configured. In TCI-states configured for different cells and different bandwidth parts (BWPs), if indexes of the TCI-states are the same, corresponding TCI-state configurations are also the same.

3. Component Carrier (CC)

The component carrier may also be referred to as a component carrier, a component carrier, a component carrier, or the like. Each carrier in multi-carrier aggregation may be referred to as a "CC". The terminal device may receive data on a plurality of CCs. Each carrier includes one or more physical resource blocks (PRBs), and each carrier may have a corresponding PDCCH and a PDSCH that is used to schedule a CC. Alternatively, some carriers do not have a PDCCH, and in this case, cross-carrier scheduling may be performed on the carriers.

Cross-carrier scheduling: The network device sends a PDCCH on one CC to schedule data transmission on another CC, that is, the network device transmits a PDSCH on another CC, or transmits a PUSCH on another CC. More specifically, the network device may send a PDCCH in a bandwidth path (BWP) on a CC, to schedule transmission of a PDSCH or a PUSCH in a BWP on another CC. That is, a control channel is transmitted on one CC, and a corresponding data channel is transmitted on another CC.

4. Beam

Beams are communication resources. A beam may be a wide beam, a narrow beam, or a beam of another type. A beamforming technology may be a beamforming technology or another technical means. A beamforming technology may be specifically a digital beamforming technology, an analog beamforming technology, or a hybrid digital/analog beamforming technology. Different beams may be considered as different resources. Same information or different information may be sent using different beams.

Optionally, a plurality of beams that have the same or similar communication features may be considered as one beam. One beam corresponds to one or more antenna ports, and is used to transmit a data channel, a control channel, a sounding signal, and the like. The one or more antenna ports corresponding to the beam may also be considered as one antenna port set.

A beam used to send a signal may be referred to as a transmit beam (transmission beam, Tx beam), or may be referred to as a spatial domain transmit filter or a spatial transmit parameter. A beam used to receive a signal may be referred to as a receive beam (Rx beam), or may be referred to as a spatial domain receive filter or a spatial reception parameter (spatial RX parameter).

A transmit beam may refer to distribution of signal strength formed in different directions in space after a signal is transmitted through an antenna, and a receive beam may refer to distribution of signal strength, in different directions in space, of a radio signal received from an antenna.

Beams may be classified into a transmit beam and a receive beam of a network device, and a transmit beam and a receive beam of a terminal device. The transmit beam of the network device is used to describe transmit-side beamforming information of the network device, and the receive beam of the network device is used to describe receive-side beamforming information of the network device. The transmit beam of the terminal device is used to describe transmit-side beamforming information of the terminal device, and the receive beam of the terminal device is used to describe receive-side beamforming information of the terminal device. To be specific, the beam may be used to describe beamforming information.

A beam usually corresponds to a resource and may correspond to a time resource, a space resource, and a frequency domain resource.

Optionally, a beam may alternatively correspond to a reference signal resource (for example, a reference signal resource for beamforming) or beamforming information.

Optionally, a beam may alternatively correspond to information associated with a reference signal resource of the network device. The reference signal may be, for example, a CSI-RS, an SSB, a DMRS, a PTRS, or a TRS. The information associated with the reference signal resource may be an identifier of the reference signal resource, the QCL information (for example, the type D QCL), or the like. The identifier of the reference signal resource corresponds to a transmit-receive beam pair that is previously established during measurement performed based on the reference signal resource. The terminal device may infer beam information based on an index of the reference signal resource.

Optionally, a beam may further correspond to a spatial domain filter (spatial filter or spatial domain filter), or a spatial domain transmission filter.

The receive beam may be equivalent to a spatial transmission filter, a spatial domain transmission filter, a spatial domain receive filter, or a spatial receive filter. The transmit beam may be equivalent to a spatial domain filter, a spatial domain transmission filter, a spatial domain transmit filter, or a spatial transmit filter. Information about the spatial related parameter may be equivalent to a spatial filter (spatial domain transmission/receive filter). Optionally, the spatial filter usually includes a spatial transmit filter and/or a spatial receive filter. The spatial filter may also be referred to as a spatial domain transmit filter, a spatial domain receive filter, a spatial transmission filter, a spatial domain transmission filter, or the like. A receive beam on a terminal device side and a transmit beam on a network device side each may be a downlink spatial filter, and a transmit beam on the terminal device side and a receive beam on the network device side each may be an uplink spatial filter.

5. Antenna Port

An antenna port may also be referred to as a port for short. An antenna port is a transmit antenna identified by a receive end device or a transmit antenna that can be distinguished in space. One antenna port may be configured for each virtual antenna. A virtual antenna may be a weighted combination of a plurality of physical antennas, and each antenna port may correspond to one reference signal port.

6. Bandwidth Part (BWP)

In NR, different terminal devices in a same cell may have different transmitting or receiving capabilities. Therefore, a communication system may configure corresponding bandwidth for each terminal device. The bandwidth configured for the terminal device is referred to as a BWP, and the terminal device performs transmission in the BWP of the terminal device. The BWP may be a group of consecutive frequency domain resources on a carrier, for example, a physical resource block (PRB). Frequency domain resources that may be occupied by different BWPs may partially overlap, or may not overlap each other. The frequency domain resources occupied by the different BWPs may have same bandwidth or different bandwidth. This is not limited in embodiments of this application. A minimum granularity of the BWP in frequency domain may be one PRB.

In a single-carrier scenario, one terminal device may have only one active BWP at a same moment, and the terminal device receives data/a reference signal or send data/a reference signal only in the active BWP (active BWP).

In embodiments of this application, when this application is applicable to a BWP scenario, a specific BWP may alternatively be a bandwidth set at a specific frequency, a set including a plurality of resource blocks (RBs), or the like. This is not limited.

The following uses a 5G communication system as an example to describe embodiments of this application.

Multiple-in multiple-out (MIMO) is a multiple-antenna technology in which a plurality of antennas is configured at both the transmit end and the receive end, to form a plurality of channels between transmission and reception. MIMO can improve a capacity and a coverage area of the communication system, so that user experience can be improved.

With development of intelligent terminal devices, a bandwidth requirement of a terminal device increases explosively, and it is difficult for a current spectrum resource to satisfy the bandwidth requirement of the terminal device. Therefore, a high frequency band (for example, a millimeter-wave band) with wider available bandwidth becomes a candidate frequency band in the 5G communication system. In addition, the combined size of a plurality of antennas configured for the terminal device can be further greatly reduced by using the high frequency band, to facilitate obtaining of a location of the terminal device and deployment of more antennas. However, when a signal is transmitted by using the high frequency band, a radio transmission loss of the signal is increased, and especially, the impact caused by factors such as atmosphere and vegetation on the signal aggravates the loss.

To use the high frequency band, a signal transmission mechanism based on a beamforming technology is introduced to a communication system, to compensate for the loss in a signal transmission process by increasing an antenna gain. Beamforming, which may also be referred to as beamforming or spatial domain filtering, is a signal processing technology of using a sensor array to directionally send and receive signals. To be specific, signals are sent and received by using a beam with a specific direction (for example, a directional beam). A beam is a communication resource, different beams correspond to different directions, and different beams may be considered as different resources. A beam used to send a signal may be referred to as a transmit beam (transmission beam, Tx beam), and a beam used to receive a signal may be referred to as a receive beam (reception beam, Rx beam).

Because a signal transmitted based on the beamforming technology has specific directionality, to track a change of a formed beam in the signal transmission process, channel quality measurement based on the beamforming technology is introduced to the 5G communication system. The channel quality measurement may be based on a beamformed synchronization signal or CSI-RS. The terminal device measures measurement signals sent by a network device by using a plurality of beams, to determine N better beams, and reports measurement information of the N better beams to the network device. The beam measurement information mainly includes at least one of a reference signal resource index, a reference signal received power (RSRP), and a signal to interference plus noise ratio (SINR) of a reference signal. Correspondingly, the terminal device sends measurement reference signals to the network device by using the plurality of beams, so that the network device can measure the plurality of measurement reference signals sent by the terminal device, to use better beams in the plurality of beams as beams for performing uplink transmission with the terminal device, and indicate information about these beams to the terminal device.

In this case, a beam may correspond to information associated with a reference signal resource of the network device. The reference signal resource corresponds to a transmit-receive beam pair that is previously established during measurement performed based on the reference signal resource. The terminal device may infer beam information by using the information associated with the reference signal resource.

Currently, a mechanism for a network device to indicate beam information to a terminal device using spatial parameter information is proposed. The spatial parameter information may include QCL information and spatial relation information. The spatial relation information may indicate a spatial related parameter (which may also be referred to as a spatial related characteristic) of an uplink signal, and may be used to assist in describing transmit beam information and a transmission procedure of the terminal device.

The spatial relation information is used as an example. The spatial relation information may indicate a spatial sending parameter relationship between two reference signals. A target reference signal is usually a downlink signal, for example, may be a DMRS or an SRS. A referenced reference signal or a source reference signal may be usually any one of a CSI-RS, an SRS, an SSB, or the like. It should be understood that the target reference signal and the source reference signal are reference signals sent based on an established transmit-receive beam pair when the network device and the terminal device previously perform channel quality measurement. Therefore, the target reference signal and the source reference signal correspond to one transmit-receive beam pair. Based on the spatial sending parameter relationship between the two reference signals, the terminal device may infer beam information corresponding to the target reference signal. In this case, the beam information is beam information that may be used to send an uplink signal and/or an uplink channel.

The following describes, by using an example, how the network device indicates, to the terminal device by using the spatial relation information, the beam information used to transmit the uplink signal and the uplink channel.

1. PUCCH: The network device may indicate, by using two-level signaling: RRC signaling and a MAC CE, beam information used to transmit the PUCCH.

For example, the network device may configure N pieces of spatial relation information for the terminal device by using the RRC signaling. For example, the RRC signaling includes a spatialRelationInfoToAddModList information element, the information element carries a PUCCH-SpatialRelationInfo sequence, and the sequence includes the N pieces of spatial relation information.

Each piece of spatial relation information indicates one piece of beam information. N is an integer greater than or equal to 1.

When N is greater than 1, the network device may activate or deactivate one of the N pieces of spatial relation information by using the MAC CE. When the MAC CE is used to activate the spatial relation information, the terminal device may send the PUCCH to the network device by using beam information indicated by the spatial relation information. When the MAC CE is used to deactivate the spatial relation information, the terminal device stops using beam information indicated by the spatial relation information to send the PUCCH to the network device.

FIG. 3 shows a format of a MAC CE. As shown in FIG. 3, when the network device activates one of the N pieces of spatial relation information by using the MAC CE, a format of the MAC CE may be shown in FIG. 3. Meanings of fields (which may also be referred to as fields) in the MAC CE may be as follows:

Serving cell ID: This field indicates a serving cell ID to which the MAC CE is applied.

Bandwidth part (BWP) ID: This field indicates an uplink BWP to which the MAC CE is applied.

PUCCH resource ID: This field indicates an identifier of a PUCCH resource.

$S_i$: When $S_i$ is set to 1, it indicates that spatial relation information whose PUCCH-SpatialRelationInfoId is equal to i+1 is activated. When $S_i$ is set to 0, it indicates that spatial relation information whose PUCCH-SpatialRelationInfoId is equal to i+1 is deactivated. It should be understood that only one piece of spatial relation information is active at one moment. The PUCCH-SpatialRelationInfoId herein refers to an index identifier of the spatial relation information in the PUCCH-SpatialRelationInfo sequence.

R is a reserved bit of the MAC CE, and is set to 0.

2. Sounding reference signal (SRS): The network device indicates, by using RRC signaling or a MAC CE, beam information used to transmit the SRS.

The SRS is classified into a periodic SRS, a semi-periodic SRS, and an aperiodic SRS.

For the periodic SRS, the network device may configure spatial relation information for the terminal device by using the RRC signaling, to transmit the SRS.

For the semi-periodic/semi-persistent (semi-persistent, SP) SRS, the network device may configure spatial relation information for the terminal device by using the RRC signaling, to transmit the SRS. Alternatively, the network device may indicate spatial relation information for the SRS by using the MAC CE, to transmit the SRS.

FIG. 4 shows a format of another MAC CE. As shown in FIG. 4, when the network device indicates one piece of spatial relation information for each SP SRS by using the MAC CE, a format of the MAC CE may be shown in FIG. 4. Meanings of fields in the MAC CE may be as follows.

A/D: When this field is set to 1, it indicates to activate an SP SRS resource set indicated by a subsequent field; when this field is set to 0, it indicates to deactivate an SP SRS resource set indicated by a subsequent field.

ID of a serving cell to which an SRS resource set belongs (SRS Resource Set's Cell ID): This field indicates an identifier of a serving cell to which an activated/deactivated SP SRS resource set belongs. If a C field is set to 0, this field may further indicate an identifier of a serving cell to which all resources indicated by a resource $ID_i$ field belong.

ID of a BWP to which an SRS resource set belongs (SRS Resource Set's BWP ID): This field indicates an uplink BWP to which an activated/deactivated SP SRS resource set belongs. If a C field is set to 0, this field may further indicate an identifier of a BWP to which all resources indicated by a resource $ID_i$ field belong.

C: When this field is set to 1, it indicates that there is a byte (Oct) corresponding to a resource serving cell ID field and a resource BWP ID ( ) field. When this field is set to 0, it indicates that there is no byte (Oct) corresponding to a resource serving cell ID (Resource Serving Cell ID) field and a resource BWP ID (Resource BWP ID) field.

SUL: When this field is set to 1, it indicates that the MAC CE is applied to a supplementary uplink (SUL) carrier configuration. When this field is set to 0, it indicates that the MAC CE is applied to a normal uplink (NUL) carrier configuration.

SP SRS resource set ID: This field indicates an ID of an activated or deactivated SP SRS resource set identified by SRS-ResourceSetId.

Fi: This field indicates a type of a resource corresponding to spatial relation information of an SRS resource included in the SP SRS resource set indicated by the SP SRS Resource Set ID field. F0 corresponds to the $1^{st}$ SRS resource in the resource set, F1 corresponds to the $2^{nd}$ SRS resource in the resource set, and so on. When this field is set to 1, it indicates that the type is a non zero power-channel state information reference signal (NZP CSI-RS) resource index. When this field is set to 0, it indicates that the type is a synchronization signal block (SSB) index or an SRS resource index. It should be understood that this field exists only when the MAC CE indicates to activate the SP SRS resource set.

Resource $ID_i$: This field includes an identifier of a resource of spatial relation information corresponding to an SRS resource i. Resource ID0 corresponds to the $1^{st}$ SRS resource in the resource set, Resource ID1 corresponds to the $2^{nd}$ SRS resource in the resource set, and so on. If Fi is set to 0 and the $1^{st}$ bit of this field is set to 1, the remaining information of this field includes an SSB index. If Fi is set to 0 and the $1^{st}$ bit of this field is set to 0, the remaining information of this field includes an SRS resource identifier. It should be understood that this field exists only when the MAC CE indicates to activate the SP SRS resource set.

Resource serving cell $ID_i$: This field indicates an identifier of a serving cell to which a resource of spatial relation information corresponding to an SRS resource i belongs.

Resource BWP $ID_i$: This field indicates an identifier of an uplink BWP to which a resource of spatial relation information corresponding to an SRS resource i belongs.

R is a reserved bit of the MAC CE, and is set to 0.

For the aperiodic (AP) SRS, the network device may configure spatial relation information for the terminal device by using the RRC signaling, to transmit the SRS. Alternatively, the network device may indicate spatial relation information for the SRS by using the MAC CE, to transmit the SRS.

It should be understood that the spatial relation information allocated to the SRS (the periodic SRS, the semi-periodic SRS, or the aperiodic SRS) may be a reference signal resource selected by the network device from all reference signal resources.

It should be noted that, the allocating spatial relation information to the SRS by using the MAC CE may be: indicating one piece of spatial relation information to one SRS by using one MAC CE; indicating one piece of spatial relation information to each SRS in one SRS resource set by using one MAC CE; or indicating one piece of spatial relation info to each of some SRSs in one SRS resource set by using one MAC CE. For example, the SRS resource set includes M SRS resources, and one piece of spatial relation information may be indicated to each of the M SRS resources by using one MAC CE, that is, the MAC CE indicates M pieces of spatial relation information in total. Alternatively, one piece of spatial relation information may be indicated to each of Z SRS resources by using one MAC CE, that is, the MAC CE indicates Z pieces of spatial relation information in total. M may be, for example, an integer greater than or equal to 2, and Z may be, for example, an integer greater than 0 and less than M.

3. Physical uplink shared channel (PUSCH): The network device indicates, by using downlink control information (DCI), beam information used to transmit the PUSCH.

For example, the network device may indicate an SRS resource by using an SRS resource indicator (SRI) field in the DCI, and spatial relation information of the SRS resource is used to transmit the PUSCH.

It should be understood that the foregoing MAC CEs indicating spatial parameter information of different signals or channels are distinguished based on logical channel identifiers (LCIDs) in MAC headers of the MAC CEs. In other words, a function of the MAC CE is indicated by the LCID. For example, an LCID of a MAC CE for activating/deactivating PUCCH spatial relation information is 49, and an LCID of a MAC CE for activating/deactivating an SP SRS is 50.

In conclusion, beam indication manners of the foregoing uplink channels and uplink signals may be shown in the following Table 1.

TABLE 1

| Signal/Channel | Beam indication manner |
|---|---|
| PUCCH | First configure N pieces of spatial relation information by using RRC signaling Then, activate one of the N pieces of spatial relation information by using a MAC CE |
| SRS | Periodic SRS: Configure spatial relation information by using RRC signaling Semi-periodic SRS: Configure spatial relation information by using the RRC signaling, or indicate spatial relation information to the semi-periodic SRS by using a MAC CE |
| | Aperiodic SRS: Configure spatial relation information by using the RRC signaling, or indicate spatial relation information by using the MAC CE |
| PUSCH | Indicate spatial relation information of the PUSCH by using an SRI field in DCI |

It can be learned from Table 1 that the network device needs to use different spatial parameter information indication mechanisms to indicate beam information for different uplink channels and uplink signals. Implementation complexity between the network device and the terminal device is high.

Considering the foregoing problem, embodiments of this application provide a communication method. A spatial parameter in a spatial parameter set configured for an uplink channel is indicated for use by another uplink channel and/or uplink signal, so that a same spatial parameter information indication mechanism can indicate spatial parameter information, indication overheads are reduced, and implementation complexity between the network device and the terminal device is reduced.

The following describes in detail the technical solutions in embodiments of this application with reference to specific embodiments by using the network device and the terminal device as an example. The following several specific embodiments may be combined with each other, and same or similar concepts or processes may not be described in detail in some embodiments.

Figures 5, 6:
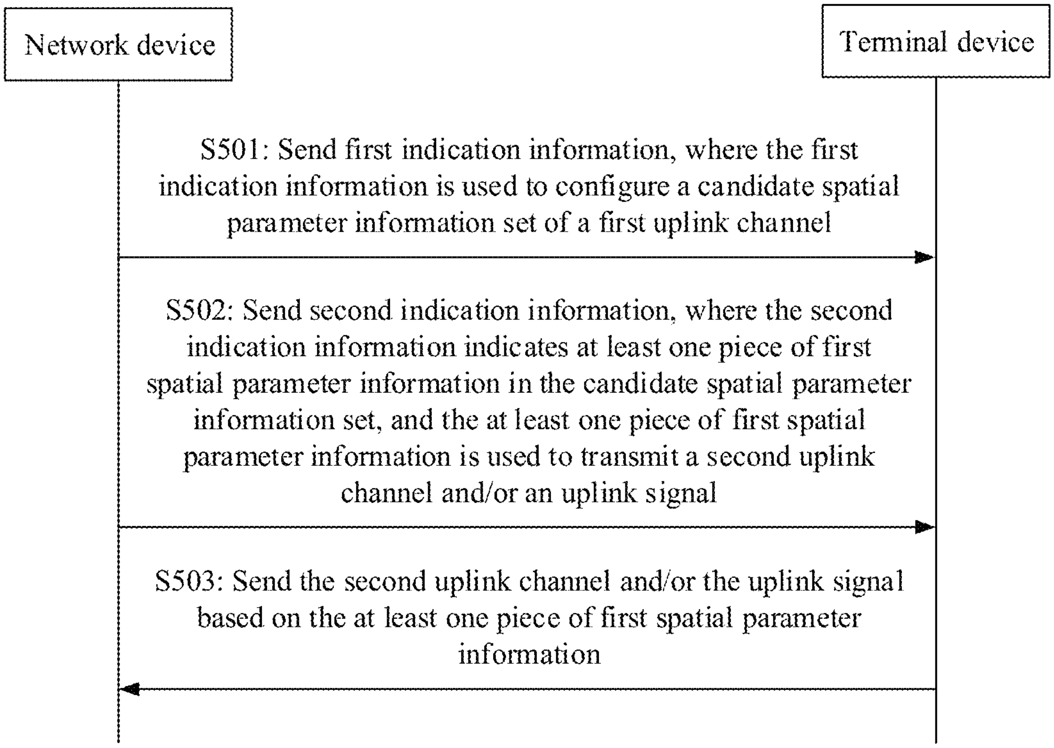
FIG. 5 is a schematic flowchart of a communication method according to an embodiment of this application.
FIG. 6 is a format of a MAC CE according to an embodiment of this application.

FIG. 5 is a schematic flowchart of a communication method according to an embodiment of this application. This embodiment describes a process of indicating, for use by a second uplink channel and/or an uplink signal, a spatial parameter in a spatial parameter set configured for a first uplink channel. As shown in FIG. 5, the method includes the following steps.

S501: A network device sends first indication information to a terminal device, where the first indication information is used to configure a candidate spatial parameter information set of a first uplink channel. Correspondingly, the terminal device receives the first indication information.

In a possible implementation, the first uplink channel may be, for example, an uplink control channel (for example, a PUCCH) or an uplink data channel (for example, a PUSCH).

In a possible implementation, the first indication information may be carried in RRC signaling. For example, the first uplink channel is a PUCCH. In this case, the first indication information may be carried in, for example, a spatialRelationInfoToAddModList information element in the RRC signaling. For example, the first uplink channel is a PUSCH. In this case, the first indication information may be carried in, for example, a newly added information element or an existing information element in the RRC signaling. This is not limited herein. It should be understood that in embodiments of this application, the "information element" may be replaced with a "field", and meanings of the "information element" and the "field" are equivalent.

It should be understood that the candidate spatial parameter set may include at least one piece of spatial parameter information, and each piece of spatial parameter information may indicate one piece of beam information. For a manner in which spatial parameter information indicates beam information, refer to the foregoing descriptions. For example, the spatial parameter information may be the foregoing spatial relation information, TCI state, TCI state identifier, QCL information, or type D QCL information.

The spatial parameter information in the candidate spatial parameter information set is a spatial parameter that is configured by the network device and that can be used to transmit the first uplink channel. If the candidate spatial parameter information set includes a plurality of pieces of spatial parameter information, a specific piece of spatial parameter information that is in the candidate spatial parameter information set and that is used to transmit the first uplink channel may be further indicated by using other indication information.

It should be understood that, that the candidate spatial parameter information set may be used to transmit the first uplink channel may be understood as follows: A reference signal resource or a resource identifier indicated by the at least one piece of spatial parameter information in the candidate spatial parameter information set and the first uplink channel or a DMRS resource of the first uplink channel satisfy a QCL relationship (or referred to as using a same/similar spatial filter, or referred to as using same QCL information, or referred to as using a same transmission configuration indicator (TCI) state, or referred to as having a same/similar spatial related parameter).

S502: The network device sends second indication information to the terminal device, where the second indication information indicates at least one piece of first spatial parameter information in the candidate spatial parameter information set, and the at least one piece of first spatial parameter information is used to transmit a second uplink channel and/or an uplink signal. In other words, the at least one piece of first spatial parameter information used to transmit the second uplink channel and/or the uplink signal is a subset of the candidate spatial parameter set of the first uplink channel.

In this embodiment, the first uplink channel and the second uplink channel are of different types. For example, the first uplink channel is an uplink control channel, and the second uplink channel is an uplink data channel; or the first uplink channel is an uplink data channel, and the second uplink channel is an uplink control channel.

In a possible implementation, the first uplink channel is a PUCCH, the uplink signal may be an SRS, and the second uplink channel may be a PUSCH. In the implementation, at least one piece of first spatial parameter information used to transmit the SRS and/or the PUSCH is a subset of a candidate spatial parameter set of the PUCCH.

In a possible implementation, the second indication information may be carried in a first MAC CE. In other words, the second indication information may be carried by the first MAC CE. Alternatively, the network device sends a first MAC CE to the terminal device, where the first MAC CE carries the second indication information. In the implementation, the foregoing first indication information may be carried in, for example, RRC signaling.

FIG. 6 is a format of a MAC CE according to an embodiment of this application. As shown in FIG. 6, a format of the first MAC CE may be shown in, for example, FIG. 6, and meanings of fields in the first MAC CE may be as follows.

Serving cell ID: This field indicates an identifier of a serving cell in which an SRS resource ID is located, that is, an identifier of a serving cell in which the SRS is located.

BWP ID: This field indicates an identifier of a BWP in which an SRS resource ID is located.

PUCCH-spatial relation information ID (PUCCH-SpatialRelaionInfoId): This field indicates spatial relation information of an SRS resource ID. In other words, this field indicates the at least one piece of first spatial parameter information in the candidate spatial parameter information set.

Figure 7:
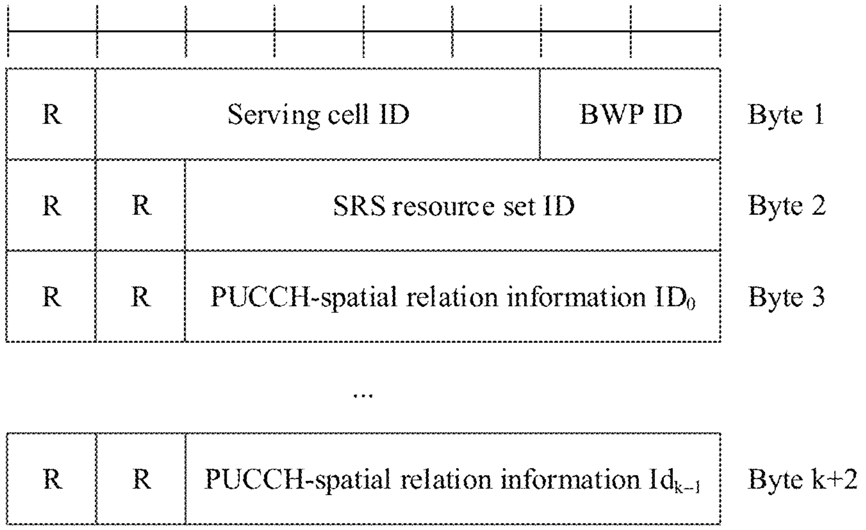
FIG. 7 is a format of another MAC CE according to an embodiment of this application.

FIG. 7 is a format of another MAC CE according to an embodiment of this application. As shown in FIG. 7, a format of the first MAC CE may alternatively be shown in, for example, FIG. 7, and meanings of fields in the first MAC CE may be as follows.

Serving cell ID: This field indicates an identifier of a serving cell in which an SRS resource set ID is located.

BWP ID: This field indicates an identifier of a BWP in which an SRS resource set ID is located.

PUCCH-SpatialRelaionInfoIdi: This field indicates spatial relation information of an $(i+1)^{th}$ SRS resource in an SRS resource set ID. In other words, this field indicates the at least one piece of first spatial parameter information in the candidate spatial parameter information set. For example, PUCCH-SpatialRelaionInfoId0 indicates spatial relation information of the $1^{st}$ SRS resource in the SRS resource set ID, PUCCH-SpatialRelaionInfoId1 indicates spatial relation information of the $2^{nd}$ SRS resource in the SRS resource set ID, and so on. A value of i is an integer greater than or equal to 0, and a maximum value of i is equal to a quantity of SRS resources included in an SRS resource set minus 1.

It should be understood that the formats of the first MAC CE shown in FIG. 6 and FIG. 7 are merely examples. A specific format of the first MAC CE is not limited in this embodiment of this application.

The first MAC CE may be a newly added MAC CE. It may be understood that the first MAC CE and an existing MAC CE do not have a same logical channel identifier. For example, the first MAC CE and an existing MAC CE in Release 16 do not have a same logical channel identifier. Alternatively, the first MAC CE may reuse a preset MAC CE (for example, an existing MAC CE in Release 16). It should be understood that, when the first MAC CE reuses the preset MAC CE, a logical channel identifier of the first MAC CE and a logical channel identifier of the preset MAC CE may be the same but have different formats. Herein, the change of a format of a MAC CE is related to content carried in the MAC CE.

Optionally, the preset MAC CE may be an existing MAC CE indicating spatial parameter information, or may be a MAC CE having another function.

For example, the first MAC CE reuses the preset MAC CE. When the preset MAC CE may be the existing MAC CE indicating the spatial parameter information, the preset MAC CE may be, for example, one of the following two types MAC CEs:

First type of preset MAC CE:

The preset MAC CE may indicate second spatial parameter information. The second spatial parameter information is used to transmit the uplink signal. In other words, the preset MAC CE reused by the first MAC CE is an existing MAC CE indicating the spatial parameter information for the uplink signal.

For example, the uplink signal is an SRS. In this case, the preset MAC CE may be, for example, an existing MAC CE in Release 16 for activating/deactivating an SP SRS (that is, the MAC CE shown in FIG. 4, or the MAC CE whose LCID is 50) or an existing MAC CE that is in Release 16 and that indicates spatial relation information of an AP SRS.

For example, the first MAC CE may reuse the MAC CE shown in FIG. 4. In this case, the first MAC CE and the MAC CE shown in FIG. 4 may have a same LCID but have different formats. For example, the format of the first MAC CE may be shown in FIG. 6 or FIG. 7. In other words, in this example, the MAC CE shown in FIG. 6 or FIG. 7 and the MAC CE shown in FIG. 4 have a same LCID.

Second type of preset MAC CE: The preset MAC CE may be an existing MAC CE indicating spatial parameter information for the first uplink channel.

For example, the first uplink channel is a PUCCH, and the preset MAC CE may be, for example, the MAC CE shown in FIG. 3. In other words, the first MAC CE and the MAC CE shown in FIG. 3 have a same logical channel identifier. For example, the first MAC CE and the MAC CE shown in FIG. 3 have a same format. In this case, in addition to being used to transmit the first uplink channel, the spatial parameter information indicated by the MAC CE shown in FIG. 3 is also used to transmit the second uplink channel and/or the uplink signal. Alternatively, the first MAC CE and the MAC CE shown in FIG. 3 have different formats. In this case, in addition to indicating the spatial parameter information used to transmit the first uplink channel, the first MAC CE may further indicate the spatial parameter information used to transmit the second uplink channel and/or the uplink signal. For example, the first MAC CE may indicate three pieces of spatial parameter information. The three pieces of spatial parameter information are respectively used to transmit the first uplink channel, the uplink signal, and the second uplink channel. For example, the first MAC CE may indicate one piece of spatial parameter information. The spatial parameter information may be used to transmit the first uplink channel, the uplink signal, and the second uplink channel.

It should be understood that the formats of the preset MAC CE shown in FIG. 4 and FIG. 3 are merely examples.

The first MAC CE may further reuse another preset MAC CE. This is not limited in embodiments of this application.

When the first MAC CE reuses the preset MAC CE and has a format different from that of the preset MAC CE, the first MAC CE and the preset MAC CE may be distinguished, for example, in the following two manners:

First manner: The first MAC CE and the preset MAC CE each include a first field, and the first field indicates that a MAC CE to which the first field belongs is the first MAC CE or the preset MAC CE.

To be specific, when logical channel identifiers are the same, the first field is used to assist in identifying whether the MAC CE is the first MAC CE or the preset MAC CE. In other words, after receiving a MAC CE or when receiving a MAC CE, the terminal device may determine, based on a logical channel identifier and a value of the first field, whether the MAC CE is the first MAC CE or the preset MAC CE.

It should be understood that a location of the first field in the first MAC CE is the same as that in the preset MAC CE. For example, the first field may be an R field in the preset MAC CE. When the R field is set to 0, it indicates that a MAC CE in which the R field is currently located is the preset MAC CE; when the R field is set to 1, it indicates that a MAC CE in which the R field is currently located is the first MAC CE. Alternatively, when the R field is set to 1, it indicates that a MAC CE in which the R field is currently located is the preset MAC CE; when the R field is set to 0, it indicates that a MAC CE in which the R field is currently located is the first MAC CE.

For example, the MAC CEs shown in FIG. 4 and FIG. 6 are used as examples. Assuming that the MAC CE shown in FIG. 4 is the preset MAC CE, the MAC CE shown in FIG. 6 is the first MAC CE, and the two MAC CEs have a same logical channel identifier, the R field herein may be, for example, an R field located at the $1^{st}$ bit of a byte 2 in the two MAC CEs.

Second manner: Before sending the second indication information, the network device may first send third indication information to the terminal device, where the third indication information includes a second field, and a value of the second field is associated with a format of a MAC CE. To be specific, the network device may indicate, to the terminal device by using the value of the second field in the third indication information, whether a subsequently sent MAC CE is the first MAC CE or the preset MAC CE. Alternatively, the value of the second field indicates whether the network device allocates, in the manner shown in this embodiment, the spatial parameter information used to transmit the second uplink channel and/or the uplink signal, or allocates, in an existing manner, the spatial parameter information used to transmit the second uplink channel and/or the uplink signal. Alternatively, the "method procedure shown in this embodiment" is activated or deactivated by using the value of the second field. Alternatively, the method in this embodiment is enabled or disabled by using the value of the second field, where "disable" may also be referred to as "disable" or "disable".

Correspondingly, after receiving the third indication information, the terminal device may determine, based on the value of the second field in the third indication information, whether the to-be-received MAC CE is the first MAC CE. To be specific, the terminal device may determine, based on the value of the second field, whether the network device subsequently transmits the first MAC CE or the preset MAC CE to the terminal device.

It should be understood that the foregoing descriptions of the value of the second field in the third indication information is merely an example for describing how to implement the method in embodiments of this application that use the third indication information. The embodiments of this application is not limited thereto. Any similar function that can implement the method in this embodiment of this application by using indication information shall fall within the protection scope of this embodiment of this application.

In a possible implementation, when the second field in the third indication information is a first value, it is determined that the to-be-received MAC CE is the first MAC CE; when the second field in the third indication information is a second value, it is determined that the to-be-received MAC CE is the preset MAC CE. Alternatively, when the second field in the third indication information is a first value, it is determined that a MAC CE whose logical channel identifier is X is the first MAC CE; when the second field in the third indication information is a second value, it is determined that a MAC CE whose logical channel identifier is X is the preset MAC CE. Optionally, X may be 49, 50, or another positive integer.

For example, when the value of the second field is 1, it indicates that the first MAC CE is subsequently sent to the terminal device. In other words, the network device allocates, in the manner shown in some embodiments, the spatial parameter information used to transmit the second uplink channel and/or the uplink signal. When the value of the second field is 0, it indicates that the preset MAC CE is subsequently sent to the terminal device. In other words, the network device allocates, in the existing manner, the spatial parameter information used to transmit the second uplink channel and/or the uplink signal. For example, the uplink signal is an SRS. In other words, the network device allocates, in the manner described in FIG. 4, the spatial parameter information used to transmit the SRS.

Alternatively, when the value of the second field is 0, it indicates that the first MAC CE is subsequently sent to the terminal device. In other words, the network device allocates, in the manner shown in this embodiment, the spatial parameter information used to transmit the second uplink channel and/or the uplink signal. When the value of the second field is 1, it indicates that the preset MAC CE is subsequently sent to the terminal device. In other words, the network device allocates, in the existing manner, the spatial parameter information used to transmit the second uplink channel and/or the uplink signal.

Optionally, the third indication information may be carried in RRC signaling. In other words, the network device may send the third indication information to the terminal device by using the RRC signaling. In this case, the third indication information may be a newly added information element in the RRC signaling, or may reuse an information element in the RRC signaling. This is not limited herein. It should be understood that the RRC signaling for sending the third indication information and the RRC signaling for sending the first indication information may be same RRC signaling or may be different RRC signaling. To be specific, the network device may separately send the first indication information and the third indication information by using different RRC signaling, or may send the first indication information and the third indication information by using one piece of RRC signaling.

Optionally, the third indication information may be carried in a MAC CE. In other words, the network device may send the third indication information to the terminal device by using the MAC CE. In this case, the third indication information may be a newly added field in the MAC CE, or may reuse a field in the MAC CE. This is not limited herein.

In another possible implementation, the second indication information may be carried in a first information field in DCI. In other words, the second indication information may be carried by the first information field in the DCI. Alternatively, the network device sends DCI to the terminal device, where a first information field in the DCI carries the second indication information. In the implementation, the foregoing first indication information may be carried in the RRC signaling or carried by the MAC CE. For example, the first uplink channel is a PUCCH. In this case, the first indication information may be, for example, carried in the spatialRelationInfoToAddModList information element in the RRC signaling or the $S_i$ field of the MAC CE shown in FIG. 3; or a MAC CE in which the first indication information is located is a newly added MAC CE (for example, a format of the MAC CE is different from a format of an existing MAC CE; or a format of the MAC CE is different from a format of an existing MAC CE, and logical channel identifiers are also different).

Optionally, the second indication information is carried in the first information field in the downlink control information, and a format of the downlink control information may be one or more of formats of DCI used to schedule uplink data. For example, the format of the downlink control information may be a DCI format 0_1.

The foregoing first information field may be a newly added information field in the DCI, or may be an existing information field in the DCI. For example, the second uplink channel is a PUSCH. In this case, the foregoing first information field may be, for example, an SRI field in the DCI, a UL TCI field in the DCI, or a newly added field in the DCI.

In some embodiments, a manner in which the first information field carries the second indication information is not limited, or a manner in which the first information field indicates the at least one piece of first spatial parameter information is not limited. For example, the first information field may indicate the at least one piece of spatial parameter information to the terminal device in a manner of carrying identifier information of the at least one piece of first spatial parameter information. For another example, a mapping relationship may be established between an identifier of spatial parameter information in the candidate spatial parameter information set and a code point of the first information field. The identifier of the spatial parameter information herein may be, for example, an index of the spatial parameter information in the candidate spatial parameter information set. In this case, an identifier of the at least one piece of first spatial parameter information is associated with the code point of the first information field. In this way, the network device may indicate the at least one piece of first spatial parameter information based on the code point corresponding to the identifier of the at least one piece of spatial parameter information.

For example, the candidate spatial information set includes six pieces of spatial parameter information. In this case, the mapping relationship between the identifier of the spatial parameter information in the candidate spatial parameter information set and the code point of the first information field may be, for example, shown in the following Table 2.

TABLE 2

| Spatial parameter information | Code point of the first information field |
|---|---|
| Spatial parameter information 1 | 000 |
| Spatial parameter information 2 | 001 |
| Spatial parameter information 3 | 010 |
| Spatial parameter information 4 | 011 |
| Spatial parameter information 5 | 100 |
| Spatial parameter information 6 | 101 |

It should be understood that when the at least one piece of first spatial parameter information is indicated by using the code point of the first information field, a bit occupied by the code point of the first information field may be related to a quantity of pieces of spatial parameter information included in the candidate spatial parameter information set. In addition, although Table 2 shows an example in which one code point corresponds to one piece of spatial parameter information, it may be understood that in some cases, one code point may alternatively correspond to a plurality of pieces of spatial parameter information. In the implementation, a plurality of pieces of spatial parameter information may be indicated by using one code point.

It may be understood that, when the at least one piece of first spatial parameter information is indicated by using the code point of the first information field (or before the at least one piece of first spatial parameter information is indicated by using the code point of the first information field), the mapping relationship between the identifier of the spatial parameter information in the candidate spatial parameter information set and the code point of the first information field may be preset in the terminal device, or the network device may send the mapping relationship between the identifier of the spatial parameter information in the candidate spatial parameter information set and the code point of the first information field to the terminal device (for example, the network device may send a mapping relationship between an identifier of each piece of spatial parameter information in the candidate spatial parameter information set and the code point of the first information field to the terminal device by using a MAC CE). In other words, the mapping relationship may be predefined in a protocol, or may be dynamically indicated by the network device.

Optionally, in some embodiments, before sending the second indication information or when sending the second indication information, the network device may send fourth indication information to the terminal device, where the fourth indication information includes a third field, and a value of the third field is associated with the first information field. To be specific, the network device may indicate, to the terminal device by using the value of the third field in the fourth indication information, whether there is a first information field in subsequently sent DCI. Alternatively, the value of the third field indicates whether the network device includes the second indication information in the DCI. Alternatively, the value of the third field indicates whether the network device allocates, in the manner shown in this embodiment, the spatial parameter information used to transmit the second uplink channel and/or the uplink signal, or allocates, in the existing manner, the spatial parameter information used to transmit the second uplink channel and/or the uplink signal. Alternatively, the method procedure shown in this embodiment is activated or deactivated by using the value of the third field. Alternatively, the method in this embodiment is enabled or disabled by using the value of the third field.

Correspondingly, after receiving the fourth indication information, the terminal device may determine, based on the value of the third field in the fourth indication information, whether the to-be-received DCI carries the first information field.

It should be understood that the foregoing descriptions of the value of the third field in the fourth indication information is merely an example for describing how to implement the method in this embodiment of this application by using the fourth indication information. This embodiment of this application is not limited thereto. Any similar function that can implement the method in this embodiment of this application by using indication information shall fall within the protection scope of this embodiment of this application.

In a possible implementation, when the third field in the fourth indication information is a first value, it is determined that the to-be-received DCI includes the first information field; when the third field in the fourth indication information is a second value, it is determined that the to-be-received DCI does not include the first information field. Alternatively, when the third field in the fourth indication information is a first value, it is determined that the to-be-received DCI does not include the first information field; when the third field in the fourth indication information is a second value, it is determined that the to-be-received DCI includes the first information field.

For example, when the value of the third field is 1, it indicates that the DCI subsequently sent to the terminal device includes the first information field. In other words, the network device allocates, in the manner shown in this embodiment, the spatial parameter information used to transmit the second uplink channel and/or the uplink signal. When the value of the third field is 0, it indicates that the DCI subsequently sent to the terminal device does not include the first information field. In other words, the network device allocates, in the existing manner, the spatial parameter information used to transmit the second uplink channel and/or the uplink signal. For example, the second uplink channel is a PUSCH. The network device indicates an SRS resource by using an SRI field in the DCI, and spatial relation information of the SRS resource is used to transmit the PUSCH.

Alternatively, when the value of the third field is 0, it indicates that the DCI subsequently sent to the terminal device includes the first information field. In other words, the network device allocates, in the manner shown in this embodiment, the spatial parameter information used to transmit the second uplink channel and/or the uplink signal. When the value of the third field is 1, it indicates that the DCI subsequently sent to the terminal device does not include the first information field. In other words, the network device allocates, in the existing manner, the spatial parameter information used to transmit the second uplink channel and/or the uplink signal.

Optionally, the fourth indication information may be carried in RRC signaling. In other words, the network device may send the fourth indication information to the terminal device by using the RRC signaling. In this case, the fourth indication information may be a newly added information element in the RRC signaling, or may reuse an information element in the RRC signaling. This is not limited herein. It should be understood that, when the RRC signaling is used to carry the first indication information, the RRC signaling and the RRC signaling for sending the first indication information may be same RRC signaling, or may be different RRC signaling. To be specific, the network device may separately send the first indication information and the fourth indication information by using different RRC signaling, or may send the first indication information and the fourth indication information by using one piece of RRC signaling.

Optionally, the fourth indication information may be carried in a MAC CE. In other words, the network device may send the fourth indication information to the terminal device using the MAC CE. In this case, the fourth indication information may be a newly added field in the MAC CE, or may reuse a field in the MAC CE. This is not limited herein.

Optionally, the fourth indication information may be carried in DCI. In other words, the network device may send the fourth indication information to the terminal device by using the DCI. In this case, the fourth indication information may be a newly added field in the DCI, or may reuse a field in the DCI. This is not limited herein. It should be understood that, when the DCI is used to carry the fourth indication information, the DCI and the DCI for sending the second indication information may be same DCI, or may be different DCI. To be specific, the network device may separately send the second indication information and the fourth indication information by using different DCI, or may send the second indication information and the fourth indication information by using one piece of DCI.

Optionally, in some embodiments, the network device may send fifth indication information to the terminal device, to indicate the second uplink channel and/or the uplink signal associated with the second indication information. Correspondingly, the terminal device receives the fifth indication information. In other words, the terminal device can learn of, from the fifth indication information, second uplink channels and/or uplink signals whose spatial parameter information may be indicated by the second indication information. In some other embodiments, the second uplink channel and/or the uplink signal associated with the second indication information may be predefined. To be specific, that the second indication information indicates spatial parameter information of a second uplink channel is predefined. For example, that the second indication information indicates the spatial parameter information used to transmit the PUSCH is predefined.

For example, the fifth indication information may carry an identifier (for example, an index) of the second uplink channel and/or the uplink signal, to notify the terminal device of second uplink channels and/or uplink signals whose spatial parameter information may be indicated by the second indication information. For example, the fifth indication information may be carried in RRC signaling or a MAC CE. This is not limited herein.

It should be understood that the second uplink channels indicated by the fifth indication information may be, for example, second uplink channels that belong to a same BWP or different BWPs, or may be second uplink channels that belong to a same CC or different CCs. The uplink signals indicated by the fifth indication information may be, for example, uplink signals that belong to a same BWP or different BWPs, or may be uplink signals that belong to a same CC or different CCs.

It should be further understood that the network device may separately send the fourth indication information and the fifth indication information by using different signaling, or may send the fourth indication information and the fifth indication information by using one piece of signaling. The fourth indication information and the fifth indication information may be one piece of information, or may be two different pieces of information.

It should be further understood that the network device may separately send the third indication information and the fifth indication information by using different signaling, or may send the third indication information and the fifth indication information by using one piece of signaling. The third indication information and the fifth indication information may be one piece of information, or may be two different pieces of information.

It should be further understood that the third indication information and the fourth indication information may be two different pieces of information, or may be one piece of information.

In another possible implementation, the second indication information may further indicate to the recipient to transmit the first uplink channel by using the at least one piece of first spatial parameter information. In other words, the at least one piece of first spatial parameter information not only is used to transmit the second uplink channel and/or the uplink signal, but also may be used to transmit the first uplink channel. In other words, when receiving the second indication information, the terminal device may transmit, by using the at least one piece of first spatial parameter information indicated by the second indication information, at least two of the following: the first uplink channel, the second uplink channel, the uplink signal, or the like. In this manner, signaling overheads for indicating the spatial parameter information can be reduced. In some other embodiments, that the second indication information further indicates the spatial parameter information of the first uplink channel may be predefined.

In another possible implementation, the second indication information may further indicate that the at least one piece of first spatial parameter information is used to transmit a downlink channel and/or a downlink signal. In other words, the at least one piece of first spatial parameter information not only may be used to transmit the uplink channel and/or the uplink signal, but also may be used to transmit the downlink channel and/or the downlink signal. In other words, the second indication information not only indicates the spatial parameter information of the uplink channel and/or the uplink signal, but also may indicate spatial parameter information of the downlink channel and/or the downlink signal. In other words, the spatial parameter information in the candidate spatial parameter set configured for the first uplink channel may be indicated to the terminal device for uplink or downlink transmission. In this manner, signaling overheads for indicating the spatial parameter information can be reduced. In other words, when receiving the second indication information, the terminal device may transmit, by using the at least one piece of first spatial parameter information indicated by the second indication information, at least two of the following: the first uplink channel, the second uplink channel, the uplink signal, the downlink channel, the downlink signal, or the like. In this manner, signaling overheads for indicating the spatial parameter information can be reduced.

For example, the second indication information may further indicate that the at least one piece of first spatial parameter information is used to transmit any one of the following: a physical downlink control channel (PDCCH), a physical downlink shared channel (PDSCH), or the like. The downlink signal may be, for example, a CSI-RS. In other words, the second indication information may further indicate spatial parameter information or QCL information of a type D (namely, type D QCL) of the at least one downlink (downlink signal and/or downlink channel). To be specific, the QCL information of the type D is QCL information of the type D in QCL. The type D QCL is existing beam information used to update the at least one downlink (downlink signal and/or downlink channel).

For example, the second indication information may indicate, for example, as shown in the following Table 3, spatial parameter information of a channel and a signal that are selected in a row in which any sequence number is located.

TABLE 3

| Sequence number | PUCCH | PUSCH | SRS | PDCCH | PDSCH | CSI-RS |
|---|---|---|---|---|---|---|
| 1 | | ✓ | | | | |
| 2 | | | ✓ | | | |
| 3 | | ✓ | ✓ | | | |
| 4 | ✓ | ✓ | | | | |
| 5 | ✓ | | ✓ | | | |
| 6 | ✓ | ✓ | ✓ | | | |
| 7 | | ✓ | | ✓ | | |
| 8 | ✓ | ✓ | | ✓ | | |
| 9 | | ✓ | | | ✓ | |
| 10 | ✓ | ✓ | | | | ✓ |
| 11 | | ✓ | | | | ✓ |
| 12 | ✓ | ✓ | | | | ✓ |
| 13 | | ✓ | | ✓ | ✓ | |
| 14 | ✓ | ✓ | | ✓ | ✓ | |
| 15 | | ✓ | | | ✓ | ✓ |
| 16 | ✓ | ✓ | | | ✓ | ✓ |
| 17 | | ✓ | | ✓ | ✓ | ✓ |
| 18 | ✓ | ✓ | | ✓ | ✓ | ✓ |
| 19 | | | ✓ | ✓ | | |
| 20 | ✓ | | ✓ | ✓ | | |
| 21 | | | ✓ | | ✓ | |
| 22 | ✓ | | ✓ | | | ✓ |
| 23 | | | ✓ | | | ✓ |
| 24 | ✓ | | ✓ | | | ✓ |
| 25 | | | ✓ | ✓ | ✓ | |
| 26 | ✓ | | ✓ | ✓ | ✓ | |
| 27 | | | ✓ | | ✓ | ✓ |
| 28 | ✓ | | ✓ | | ✓ | ✓ |
| 29 | | | ✓ | ✓ | ✓ | ✓ |
| 30 | ✓ | | ✓ | ✓ | ✓ | ✓ |
| 31 | | ✓ | ✓ | ✓ | | |
| 32 | ✓ | ✓ | ✓ | ✓ | | |
| 33 | | ✓ | ✓ | | ✓ | |
| 34 | ✓ | ✓ | ✓ | | | ✓ |
| 35 | | ✓ | ✓ | | | ✓ |
| 36 | ✓ | ✓ | ✓ | | | ✓ |
| 37 | | ✓ | ✓ | ✓ | ✓ | |
| 38 | ✓ | ✓ | ✓ | ✓ | ✓ | |
| 39 | | ✓ | ✓ | | ✓ | ✓ |
| 40 | ✓ | ✓ | ✓ | | ✓ | ✓ |
| 41 | | ✓ | ✓ | ✓ | ✓ | ✓ |
| 42 | ✓ | ✓ | ✓ | ✓ | ✓ | ✓ |

The sequence number 40 in Table 3 is used as an example. In this case, the second indication information may simultaneously indicate spatial parameter information used to transmit the PUCCH, spatial parameter information used to transmit the PUSCH, spatial parameter information used to transmit the SRS, spatial parameter information used to transmit the PDSCH, and spatial parameter information used to transmit the CSI-RS.

It should be understood that Table 3 is merely an example for describing that the second indication information may simultaneously indicate an uplink spatial parameter and a downlink spatial parameter, and does not limit an uplink channel, a downlink channel, an uplink signal, and a downlink signal that can be indicated by the second indication information. That the second indication information specifically indicates spatial parameters of which channels and/or signals are not limited in this embodiment of this application.

In addition, the manner in which the second indication information indicates spatial parameter information is not limited in the embodiments disclosed herein. For example, the second indication information may indicate at least one piece of spatial parameter information, and the at least one piece of spatial parameter information may be simultaneously used to transmit these channels and/or signals. Alternatively, the second indication information may indicate a plurality of pieces of spatial parameter information, and different spatial parameter information is used to transmit different channels and/or signals.

It should be understood that "at least one" in embodiments of this application may be understood as "one or more".

For example, the spatial parameter information indicated by the second indication information is used to transmit the PUSCH and the PDSCH. The second indication information may indicate at least one piece of spatial parameter information, and the at least one piece of spatial parameter information is used to transmit both the PUSCH and the PDSCH. Alternatively, the second indication information may indicate spatial parameter information A and spatial parameter information B, where the spatial parameter information A is used to transmit the PUSCH, and the spatial parameter information B is used to transmit the PDSCH.

Optionally, spatial parameters indicated by the second indication information to transmit which channels and/or signals may be predefined, or may be dynamically indicated by the network device. Alternatively, some channels and/or signals may be predefined, or some channels and/or signals may be dynamically indicated. This is not limited in this embodiment of this application. For example, the spatial parameter information indicated by the second indication information to transmit the PUSCH may be predefined. Based on this, the network device may dynamically indicate that the second indication information not only indicates the spatial parameter information used to transmit the PUSCH, but also indicates the spatial parameter information used to transmit the PDSCH.

It may be understood that, it can be learned from the example shown in Table 3 that, the second indication information may indicate spatial parameter information used to transmit one type of channel (for example, channels corresponding to the sequence number 1 and the sequence number 2 in Table 3), or may indicate spatial parameters used to transmit a plurality of types of channels (for example, channels corresponding to the sequence number 3 to the sequence number 42 in Table 3). In a moving scenario, beam switching is frequently performed. In the manners disclosed herein in which the second indication information indicates the spatial parameters used to transmit the plurality of types of channels, the beam information can be quickly communicated, thereby improving indication efficiency. In this way, the terminal device can quickly complete beam switching and avoid link interruption.

Still refer to FIG. 5. In another possible implementation, after step S502, the method may further include the following step.

S503: The terminal device sends the second uplink channel and/or the uplink signal to the network device based on the at least one piece of first spatial parameter information. Correspondingly, the network device receives the second uplink channel and/or the uplink signal based on the at least one piece of first spatial parameter information.

For example, the terminal device sends the second uplink channel and/or the uplink signal to the network device by using the at least one piece of spatial parameter information. Correspondingly, the network device receives the second uplink channel and/or the uplink signal from the terminal device by using the at least one piece of spatial parameter information.

The following describes the method in an embodiment of this application by using two examples. In the following two examples, the first uplink channel is a PUCCH, the second uplink channel is a PUSCH, and the uplink signal is an SRS. The spatial parameter information is spatial relation information.

Example 1

The network device may first configure a candidate spatial relation information set for the PUCCH by using RRC signaling. The candidate spatial relation information set includes N pieces of spatial relation information.

In this example, the network device may indicate one piece of spatial relation information by using a MAC CE, and the spatial relation information may be, for example, spatial relation information whose index number is M in the candidate spatial relation information set. The spatial relation information may be used to transmit the SRS.

In this manner, spatial parameter information in a spatial parameter set configured for the PUCCH can be indicated for use by the SRS without changing an existing manner of indicating, for the terminal device, spatial parameter information used to transmit the SRS, thereby reducing implementation complexity between the network device and the terminal device.

In addition, when indicating spatial relation information for the SRS, the spatial relation information is selected from the candidate spatial relation information set. In the conventional technology, spatial parameter information indicated for the SRS is a reference signal resource selected from all reference signal resources. In this embodiment, when the spatial relation information of the SRS is indicated, an index number of at least one piece of spatial relation information in the candidate spatial relation information set needs to be carried. However, in the conventional technology, when the spatial relation information of the SRS is indicated, an index number of a reference signal resource indicating the spatial relation information in all the reference signal resources needs to be carried (in other words, a type of the reference signal resource indicating the spatial relation information and an index number of the reference signal resource in all reference signal resources of this type need to be carried). Therefore, in embodiments of this application, when indicating the spatial relation information for the SRS, only a few bits are required to indicate the spatial relation information, thereby reducing indication overheads.

It should be understood that the spatial relation information in some embodiments of this application may be replaced with a TCI state.

Example 2

The network device may first configure a candidate spatial relation information set by using RRC signaling or a MAC CE. The candidate spatial relation information set includes N pieces of spatial relation information. There is a mapping relationship between identifiers of the N pieces of spatial relation information in the candidate spatial relation information set and a code point of a first information field in DCI. Optionally, the candidate spatial relation information set may be configured for the PUCCH.

In this example, the network device may indicate, by using the code point of the first information field in the DCI, spatial relation information used to transmit the PUSCH. In this manner, spatial parameter information in a spatial parameter set configured for the PUCCH can be indicated for use by the PUSCH without changing an existing manner of indicating, for the terminal device, spatial parameter information used to transmit the PUSCH.

Compared with the conventional technology in which the network device indicates an SRS resource for the terminal device, so that spatial relation information of the SRS resource is used to transmit the PUSCH, a manner, provided in embodiments of this application, of indicating the spatial relation information for the PUSCH is more flexible and does not depend on the spatial relation information of the SRS.

According to the method provided in some embodiments, the spatial parameter information in the spatial parameter set configured for the first uplink channel is indicated for use by the second uplink channel and/or the uplink signal, so that a same spatial parameter information indication mechanism can indicate the spatial parameter information, and implementation complexity between the network device and the terminal device is reduced.

The foregoing embodiment describes how to reduce implementation complexity between the network device and the terminal device from a perspective of indicating, for use by another uplink channel and/or uplink signal, a spatial parameter in a spatial parameter set configured for an uplink channel. The following describes how to reduce implementation complexity between the network device and the terminal device and signaling overheads in a process of communicating, to a plurality of uplink channels of a same type, a spatial parameter in a spatial parameter set configured for an uplink channel.

Figure 8:
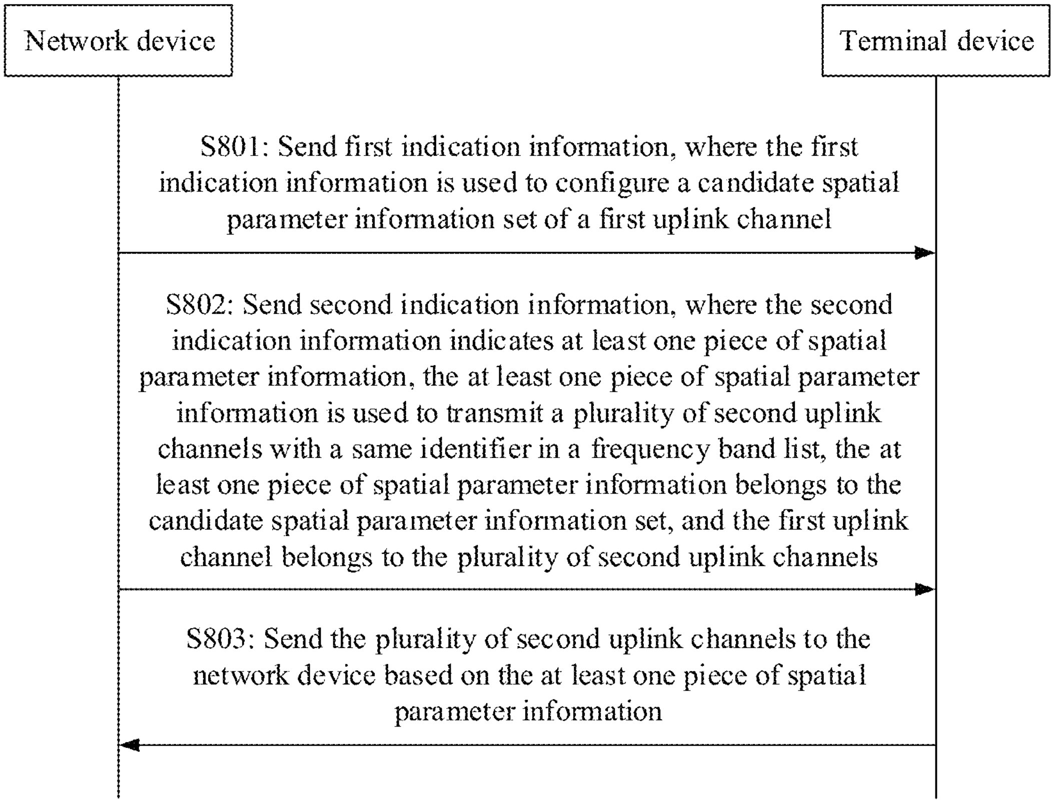
FIG. 8 is a schematic flowchart of a communication method according to an embodiment of this application.

FIG. 8 is a schematic flowchart of a communication method according to an embodiment of this application. As shown in FIG. 8, the method includes the following steps.

S801: A network device sends first indication information to a terminal device, where the first indication information is used to configure a candidate spatial parameter information set of a first uplink channel. Correspondingly, the terminal device receives the first indication information.

For a description of this step, refer to the foregoing description of step S501. Details are not described herein again.

S802: The network device sends second indication information to the terminal device, where the second indication information indicates at least one piece of spatial parameter information, the at least one piece of spatial parameter information is used to transmit a plurality of second uplink channels with a same identifier in a frequency band list, the at least one piece of spatial parameter information belongs to the candidate spatial parameter information set, and the first uplink channel belongs to the plurality of second uplink channels. Correspondingly, the terminal device receives the second indication information.

The foregoing frequency band list may be, for example, a CC list or a BWP list.

The plurality of second uplink channels with a same identifier in the foregoing frequency band list may be understood as second uplink channels with a same identifier in different frequency bands. The identifier herein may be, for example, a resource ID or an index number of the second uplink channel in a frequency band in which the second uplink channel is located.

In a possible implementation, the plurality of second uplink channels are of a same type. For example, the plurality of second uplink channels are all uplink control channels (for example, PUCCHs) or all uplink data channels (for example, PUSCHs).

For example, the frequency band list is the CC list. Assuming that the CC list includes CC1 and CC2, the second uplink channels with a same identifier herein may be, for example, a PUCCH whose resource ID is ID1 on CC1 and a PUCCH whose resource ID is ID1 on CC2.

It should be understood that the frequency band list described in this embodiment is merely intended to facilitate descriptions and explanations of a frequency domain relationship between the plurality of second uplink channels. During specific implementation, another manner may alternatively indicate the frequency domain relationship between the plurality of second uplink channels. This is not limited in this embodiment. That is, whether this feature of the frequency domain list exists does not constitute a limitation on this embodiment.

Optionally, the network device may indicate the frequency band list to the terminal device by sending third indication information to the terminal device. Correspondingly, the terminal device receives the third indication information, so that the terminal device learns of the frequency band list. For example, the third indication information may indicate the frequency band list by carrying an identifier (for example, an index) of each frequency band in the frequency band list. For example, the third indication information may be carried in RRC signaling or a MAC CE and sent to the terminal device. This is not limited herein. In this scenario, the third indication information may further indicate, to the terminal device, that spatial parameter information of the plurality of second uplink channels with a same identifier in the frequency band list is the same, and the spatial parameter information is indicated by the second indication information. Alternatively, the network device may separately send indication information to the terminal device, to indicate that spatial parameter information of the plurality of second uplink channels with a same identifier in the frequency band list is the same, and the spatial parameter information is indicated by the second indication information.

Optionally, the frequency band list may alternatively be a reused existing frequency band list. For example, the frequency band list may be a frequency band list used to update spatial parameter information of a plurality of SRSs, a frequency band list used to update spatial parameter information of a plurality of downlink data channels, or a frequency band list used to update spatial parameter information of a plurality of downlink control channels. In this scenario, the terminal device may consider by default that spatial parameter information of the plurality of second uplink channels with a same identifier in the frequency band list is the same, and the spatial parameter information is indicated by the second indication information. Alternatively, the network device may separately send indication information to the terminal device, to indicate that spatial parameter information of the plurality of second uplink channels with a same identifier in the frequency band list is the same, and the spatial parameter information is indicated by the second indication information.

In some embodiments, at least one piece of spatial parameter information in the candidate spatial parameter information set configured for the first uplink channel may be simultaneously indicated, by using one piece of second indication information, for use by the plurality of second uplink channels with a same identifier. The PUCCH is used as an example. In the implementation, at least one piece of spatial parameter information in a candidate spatial parameter information set configured for one of PUCCHs is used to transmit a plurality of PUCCHs with a same identifier in the frequency band list.

In a possible implementation, the second indication information may be carried in a MAC CE. In other words, the second indication information may be carried by the MAC CE. Alternatively, the network device sends a MAC CE to the terminal device, where the MAC CE carries the second indication information. In this case, the MAC CE may simultaneously indicate (or update) spatial parameter information of a plurality of second uplink channels with a same identifier in a plurality of frequency band lists.

The MAC CE may be a newly added MAC CE, that is, the MAC CE and an existing MAC CE do not have a same logical channel identifier. For example, the MAC CE and an existing MAC CE in Release 16 do not have a same logical channel identifier. Alternatively, the MAC CE reuses a preset MAC CE (namely, an existing MAC CE). The preset MAC CE may be an existing MAC CE indicating spatial parameter information, or may be a MAC CE having another function. It should be understood that, when the MAC CE reuses the preset MAC CE, in an implementation, the MAC CE and the preset MAC CE have a same format. In another implementation, the MAC CE and the preset MAC CE have different formats. This is not limited herein.

For example, the first uplink channel is a PUCCH. When the MAC CE reuses the preset MAC CE, the preset MAC CE may be, for example, an existing MAC CE indicating spatial parameter information for the first uplink channel, for example, the MAC CE shown in FIG. 3, and for another example, the MAC CE whose LCID is 49 in Release 16. To be specific, the spatial parameter information is indicated for the terminal device in an existing manner of indicating the spatial parameter information for the first uplink channel. A difference lies in that the indicated spatial parameter information is used to transmit the plurality of second uplink channels with a same identifier in the frequency band list, and is no longer used to transmit only the first uplink channel. In this manner, one piece of signaling can be used to simultaneously indicate spatial parameters used to transmit a plurality of uplink channels without changing an existing manner of indicating, to the terminal device, spatial parameter information used to transmit the PUCCH, so that signaling overheads are reduced and indication efficiency is improved.

Still refer to FIG. 8. In another possible implementation, after step S802, the method may further include the following step.

S803: The terminal device sends the plurality of second uplink channels to the network device based on the at least one piece of spatial parameter information.

For example, the terminal device sends the plurality of second uplink channels to the network device by using the at least one piece of spatial parameter information. Correspondingly, the network device receives the plurality of second uplink channels from the terminal device by using the at least one piece of spatial parameter information. It should be understood that the terminal device may send the plurality of second uplink channels to the network device at a same time point or at different time points by using the at least one piece of spatial parameter information. For example, a second uplink channel of a frequency band is sent to the network device at a first moment by using the at least one piece of spatial parameter information, and a second uplink channel of another frequency band is sent to the network device at a second moment by using the at least one piece of spatial parameter information.

The following describes the method in some embodiments of this application by using one example. For example, the network device may configure, by using RRC signaling, that spatial relations of PUCCHs with a same resource ID in CC #1 and CC #2 are the same. It should be understood that, that spatial relations are the same herein may refer to that reference signal resources indicated by the spatial relations are the same, or may refer to that spatial relation info IDs are the same, or the like.

It is assumed that the network device selects one piece of spatial relation information from a spatial relation information set configured for a PUCCH in CC #1 (it is assumed that an index of the spatial relation information is a spatial relation info ID #a), and indicates, by using the MAC CE, a resource ID0 allocated to CC #1 by the spatial relation info ID #a.

In an implementation, spatial relation information of the resource ID0 of CC #1 is spatial relation information indicated by the spatial relation info ID #a in the spatial relation info set configured by the network device for the PUCCH on CC #1, and spatial relation information of the resource ID0 of CC #2 is spatial relation information indicated by a spatial relation info ID #a in a spatial relation info set configured by the network device for the PUCCH on CC #2.

In another implementation, spatial relation information of the resource ID0 of CC #1 and spatial relation information of the resource ID0 of CC #2 each are spatial relation information indicated by the spatial relation info ID #a in the spatial relation info set configured by the network device for the PUCCH on CC #1.

According to the method provided in some embodiments, spatial parameters in a spatial parameter set configured for the first uplink channel are indicated for use by a plurality of uplink channels of a same type, so that one piece of signaling can be used to simultaneously indicate spatial parameters used to transmit the plurality of uplink channels, to reduce signaling overheads and improve indication efficiency.

Figure 9:
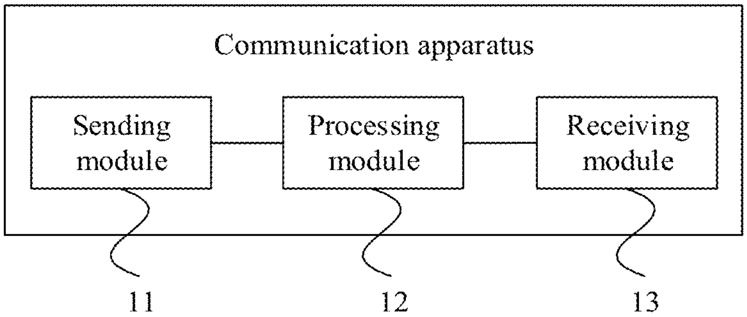
FIG. 9 is a schematic diagram of a structure of a communication apparatus according to an embodiment of this application.

FIG. 9 is a schematic diagram of a structure of a communication apparatus according to an embodiment of this application. It may be understood that the communication apparatus may correspondingly implement the operations or steps corresponding to the network device in the foregoing method embodiments. The communication apparatus may be a network device or may be a component that can be configured on the network device. As shown in FIG. 9, the communication apparatus may include a sending module 11. Optionally, in some embodiments, the communication apparatus may further include a processing module 12 and a receiving module 13. Optionally, the receiving module 13 and the sending module 11 may be integrated into a transceiver module, or may be separated. In some implementations, the sending module 11 is implemented on one or more processing circuits or processors coupled with a transmitter or transceiver. In some implementations, the processing module 12 is implemented on one or more processors or processing circuits. The receiving module 13 is implemented on one or more processing circuits or processors coupled with a receiver or a transceiver.

As shown in FIG. 9, in a possible implementation, the sending module 11 is configured to send first indication information, where the first indication information is used to configure a candidate spatial parameter information set of a first uplink channel. The sending module 11 is further configured to send second indication information, where the second indication information indicates at least one piece of first spatial parameter information in the candidate spatial parameter information set, the at least one piece of first spatial parameter information is used to transmit a second uplink channel and/or an uplink signal, and the first uplink channel and second uplink channel are of different types.

In a possible implementation, the processing module 12 is configured to receive the second uplink channel and/or the uplink signal based on the at least one piece of first spatial parameter information by using the receiving module 13.

In a possible implementation, the first uplink channel is an uplink control channel.

In a possible implementation, the uplink signal is an SRS.

In a possible implementation, the second uplink channel is an uplink data channel.

In a possible implementation, the second indication information may be carried in a first MAC CE.

Optionally, a logical channel identifier of the first MAC CE and a logical channel identifier of a preset MAC CE are the same but have different formats. For example, the first MAC CE and the preset MAC CE each include a first field, and the first field indicates that a MAC CE to which the first field belongs is the first MAC CE or the preset MAC CE. For another example, before sending the second indication information, the sending module 11 is further configured to send third indication information, where the third indication information includes a second field, and a value of the second field is associated with a format of a MAC CE.

For example, the preset MAC CE indicates second spatial parameter information, and the second spatial parameter information is used to transmit the uplink signal.

In another possible implementation, the second indication information is carried in a first information field in downlink control information. Optionally, an identifier of the at least one piece of first spatial parameter information is associated with a code point of the first information field.

Optionally, before sending the second indication information or when sending the second indication information, the sending module 11 is further configured to send fourth indication information, where the fourth indication information includes a third field, and a value of the third field is associated with the first information field.

In a possible implementation, the sending module 11 is further configured to send fifth indication information, where the fifth indication information indicates the second uplink channel and/or the uplink signal associated with the second indication information.

In a possible implementation, the second indication information further indicates to transmit the first uplink channel by using the at least one piece of first spatial parameter information.

In a possible implementation, the second indication information further indicates that the at least one piece of first spatial parameter information is used to transmit a downlink channel and/or a downlink signal.

The communication apparatus provided in an embodiment can perform the actions of the network device in the method embodiment corresponding to FIG. 5. Implementation principles and technical effects thereof are similar, and details are not described herein again.

As shown in FIG. 9, in another possible implementation, the sending module 11 is configured to send first indication information, where the first indication information is used to configure a candidate spatial parameter information set of a first uplink channel. The sending module 11 is further configured to send second indication information, where the second indication information indicates at least one piece of spatial parameter information, the at least one piece of spatial parameter information is used to transmit a plurality of second uplink channels with a same identifier in a frequency band list, the at least one piece of spatial parameter information belongs to the candidate spatial parameter information set, and the first uplink channel belongs to the plurality of second uplink channels.

In a possible implementation, the processing module 12 is configured to receive the plurality of second uplink channels based on the at least one piece of spatial parameter information by using the receiving module 13.

In a possible implementation, the plurality of second uplink channels are all uplink control channels.

In a possible implementation, the sending module 11 is further configured to send third indication information, where the third indication information indicates the frequency band list. Alternatively, the frequency band list is any one of the following lists: a frequency band list used to update spatial parameter information of a plurality of sounding reference signals SRSs; a frequency band list used to update spatial parameter information of a plurality of downlink data channels; a frequency band list used to update spatial parameter information of a plurality of downlink control channels; or the like. For example, the frequency band list is a carrier list or a bandwidth part list.

In a possible implementation, the second indication information is carried in a MAC CE or RRC signaling.

The communication apparatus provided in this embodiment can perform the actions of the network device in the method embodiment corresponding to FIG. 8. Implementation principles and technical effects thereof are similar, and details are not described herein again.

Optionally, the communication apparatus may further include at least one storage module. The storage module may comprise a storage medium and include data and/or instructions. The receiving module 13, the processing module 12, and the sending module 11 may read the data and/or the instructions in the storage module, to implement a corresponding method.

Figure 10:
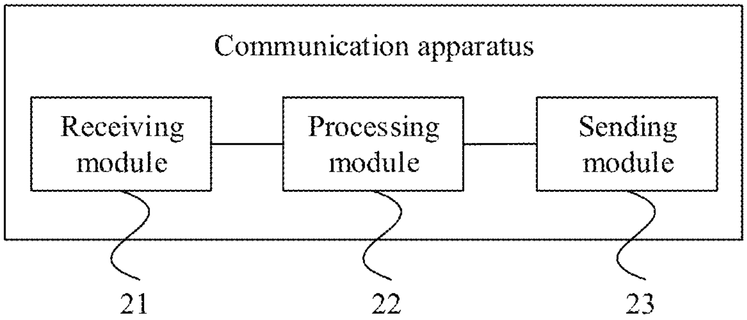
FIG. 10 is a schematic diagram of a structure of another communication apparatus according to an embodiment of this application.

FIG. 10 is a schematic diagram of a structure of another communication apparatus according to an embodiment of this application. It may be understood that the communication apparatus may correspondingly implement the operations or steps corresponding to the terminal device in the foregoing method embodiments. The communication apparatus may be a terminal device or may be a component that can be configured on the terminal device. As shown in FIG. 10, the communication apparatus may include a receiving module 21. Optionally, in some embodiments, the communication apparatus may further include a processing module 22 and a sending module 23. Optionally, the receiving module 21 and the sending module 23 may be integrated into a transceiver module or may be separated. In some implementations, the sending module 11 is implemented on one or more processing circuits or processors coupled with a transmitter or transceiver. In some implementations, the processing module 12 is implemented on one or more processors or processing circuits. The receiving module 13 is implemented on one or more processing circuits or processors coupled with a receiver or a transceiver.

As shown in FIG. 10, in a possible implementation, the receiving module 21 is configured to receive first indication information, where the first indication information is used to configure a candidate spatial parameter information set of a first uplink channel. The receiving module 21 is further configured to receive second indication information, where the second indication information indicates at least one piece of first spatial parameter information in the candidate spatial parameter information set, the at least one piece of first spatial parameter information is used to transmit a second uplink channel and/or an uplink signal, and the first uplink channel and second uplink channel are of different types.

In a possible implementation, the processing module 22 is configured to send the second uplink channel and/or the uplink signal based on the at least one piece of first spatial parameter information by using the sending module 23.

In a possible implementation, the first uplink channel is an uplink control channel.

In a possible implementation, the uplink signal is an SRS.

In a possible implementation, the second uplink channel is an uplink data channel.

In a possible implementation, the second indication information may be carried in a first MAC CE.

Optionally, a logical channel identifier of the first MAC CE and a logical channel identifier of a preset MAC CE are the same but have different formats. For example, the first MAC CE and the preset MAC CE each include a first field, and the first field indicates that a MAC CE to which the first field belongs is the first MAC CE or the preset MAC CE. For another example, before receiving the second indication information, the receiving module 21 is further configured to receive third indication information, where the third indication information includes a second field, and a value of the second field is associated with a format of a MAC CE. The processing module 22 is further configured to determine, based on the value of the second field, whether a to-be-received MAC CE is the first MAC CE.

For example, the preset MAC CE indicates second spatial parameter information, and the second spatial parameter information is used to transmit the uplink signal.

In another possible implementation, the second indication information is carried in a first information field in downlink control information.

Optionally, an identifier of the at least one piece of first spatial parameter information is associated with a code point of the first information field.

Optionally, before receiving the second indication information or when receiving the second indication information, the receiving module 21 is further configured to receive fourth indication information, where the fourth indication information includes a third field, and a value of the third field is associated with the first information field. The processing module 22 is further configured to determine, based on the value of the third field, whether to-be-received downlink control information carries the first information field.

In a possible implementation, the receiving module 21 is further configured to receive fifth indication information, where the fifth indication information indicates the second uplink channel and/or the uplink signal associated with the second indication information.

In a possible implementation, the second indication information further indicates to transmit the first uplink channel by using the at least one piece of first spatial parameter information.

In a possible implementation, the second indication information further indicates that the at least one piece of first spatial parameter information is used to transmit a downlink channel and/or a downlink signal.

The communication apparatus provided in this embodiment can perform the actions of the terminal device in the method embodiment corresponding to FIG. 5. Implementation principles and technical effects thereof are similar, and details are not described herein again.

As shown in FIG. 10, in another possible implementation, the receiving module 21 is configured to receive first indication information, where the first indication information is used to configure a candidate spatial parameter information set of a first uplink channel. The receiving module 21 is further configured to receive second indication information, where the second indication information indicates at least one piece of spatial parameter information, the at least one piece of spatial parameter information is used to transmit a plurality of second uplink channels with a same identifier in a frequency band list, the at least one piece of spatial parameter information belongs to the candidate spatial parameter information set, and the first uplink channel belongs to the plurality of second uplink channels.

In a possible implementation, the processing module 22 is configured to send the plurality of second uplink channels based on the at least one piece of first spatial parameter information by using the sending module 23.

In a possible implementation, the plurality of second uplink channels are all uplink control channels.

In a possible implementation, the receiving module 21 is further configured to receive third indication information, where the third indication information indicates the frequency band list. Alternatively, the frequency band list is any one of the following lists: a frequency band list used to update spatial parameter information of a plurality of sounding reference signals SRSs; a frequency band list used to update spatial parameter information of a plurality of downlink data channels; a frequency band list used to update spatial parameter information of a plurality of downlink control channels; or the like. For example, the frequency band list is a carrier list or a bandwidth part list.

In a possible implementation, the second indication information is carried in a MAC CE or RRC signaling.

The communication apparatus provided in this embodiment can perform the actions of the terminal device in the method embodiment corresponding to FIG. 8. Implementation principles and technical effects thereof are similar, and details are not described herein again.

Optionally, the communication apparatus may further include at least one storage module. The storage module may include data and/or instructions. The receiving module 21, the processing module 22, and the sending module 23 may read the data and/or the instructions in the storage module, to implement a corresponding method.

It should be noted that, it should be understood that in the foregoing embodiments, the sending module may be a transmitter during actual implementation, and the receiving module may be a receiver during actual implementation. Alternatively, the sending module and the receiving module are implemented by using a transceiver. Alternatively, the sending module and the receiving module are implemented by using a communication port. The processing module may be implemented in a form of software invoked by a processing element, or in a form of hardware. For example, the processing module may be at least one separately disposed processing element, or may be integrated into a chip of the foregoing apparatus for implementation. In addition, the processing module may be stored in a memory of the foregoing apparatus in a form of program code, and may be invoked by a processing element of the foregoing apparatus to perform a function of the foregoing processing module. In addition, all or some of the modules may be integrated together, or may be implemented independently. The processing element herein may be an integrated circuit and has a signal processing capability. In an implementation process, steps in the foregoing methods or the foregoing modules can be implemented by using a hardware integrated logical circuit in the processing element, or by using instructions in a form of software.

To be specific, the foregoing modules may be configured as one or more integrated circuits for performing the foregoing methods, for example, one or more application-specific integrated circuits (ASICs), one or more microprocessors (DSPs), or one or more field programmable gate arrays (FPGAs). For another example, when one of the foregoing modules is implemented by scheduling program code by a processing element, the processing element may be a general-purpose processor, for example, a central processing unit (central processing unit, CPU) or another processor that can invoke the program code. For another example, these modules may be integrated together, and implemented in a form of a system-on-a-chip (SOC).

Figure 11:
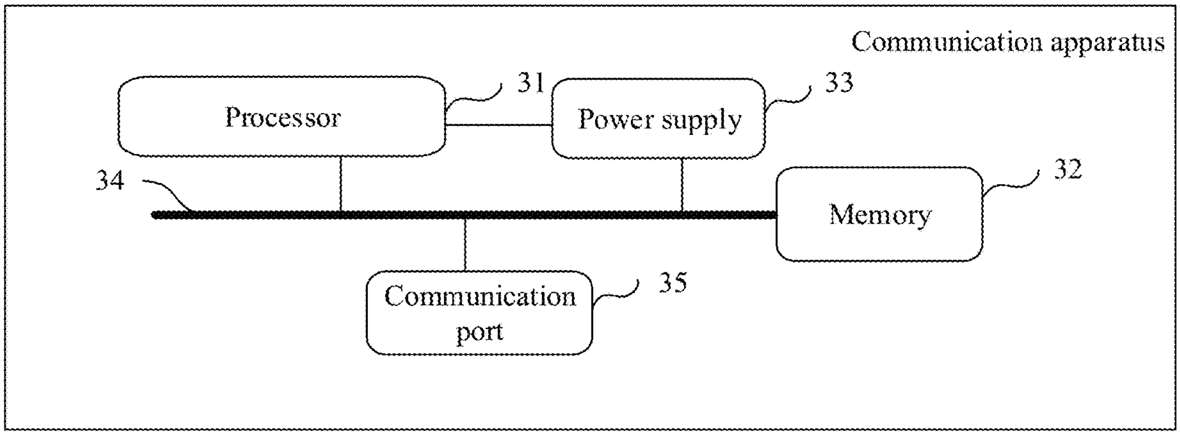
FIG. 11 is a schematic diagram of a structure of still another communication apparatus according to an embodiment of this application.

FIG. 11 is a schematic diagram of a structure of still another communication apparatus according to an embodiment of this application. As shown in FIG. 11, the communication apparatus may include at least one processor 31 (for example, a CPU) and at least one memory 32. FIG. 11 is the schematic diagram in which one processor 31 and one memory 32 are used as examples. The memory 32 may include a high-speed random access memory (RAM), and may further include a non-volatile memory (NVM), for example, at least one magnetic disk memory. The memory 32 may store various instructions and/or data, to complete various processing functions and implement the method steps of this application. Optionally, the communication apparatus in this application may further include a power supply 33, a communication bus 34, and a communication port 35. The communication bus 34 is configured to implement communication and connection between elements. The communication port 35 is configured to implement connection and communication between the communication apparatus and other peripherals.

In some possible implementations, the memory 32 is configured to store computer-executable program code, and the program code includes instructions. When the processor 31 executes the instructions, the instructions enable the processor 31 of the communication apparatus to perform the actions of the network device in the foregoing method embodiments. Implementation principles and technical effects thereof are similar, and details are not described herein again.

Figure 12:
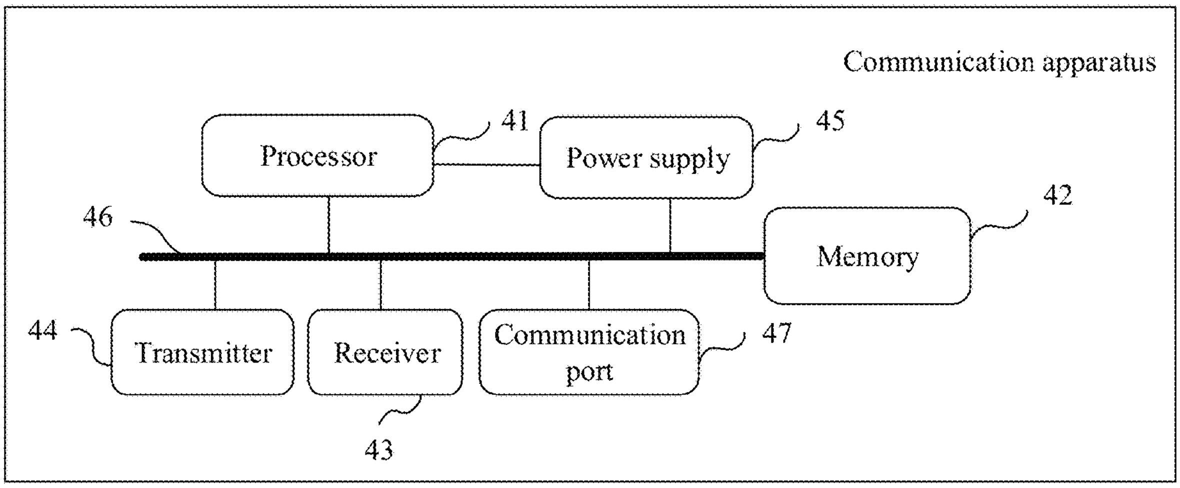
FIG. 12 is a schematic diagram of a structure of still another communication apparatus according to an embodiment of this application.

FIG. 12 is a schematic diagram of a structure of still another communication apparatus according to an embodiment of this application. As shown in FIG. 12, the communication apparatus may include a processor 41 (for example, a CPU), a memory 42, a receiver 43, and a transmitter 44. Both the receiver 43 and the transmitter 44 are coupled to the processor 41. The processor 41 controls a receiving action of the receiver 43, and the processor 41 controls a sending action of the transmitter 44. The memory 42 may include a high-speed random access memory (RAM), and may further include a non-volatile memory (NVM), for example, at least one magnetic disk memory. The memory 42 may store various instructions, to complete various processing functions and implement the method steps in this application. Optionally, the communication apparatus in this application may further include a power supply 45, a communication bus 46, and a communication port 47. The receiver 43 and the transmitter 44 may be integrated into a transceiver of the communication apparatus, or may be a separate receive antenna and a separate transmit antenna of the communication apparatus. The communication bus 46 is configured to implement communication and connection between elements. The communication port 47 is configured to implement connection and communication between the communication apparatus and other peripherals.

In this embodiment of this application, the memory 42 is configured to store computer-executable program code, and the program code includes instructions. When the processor 41 executes the instructions, the instructions enable the processor 41 of the communication apparatus to perform the processing action of the terminal device in the foregoing method embodiment, enable the receiver 43 to perform the receiving action of the terminal device in the foregoing method embodiment, and enable the transmitter 44 to perform the sending action of the terminal device in the foregoing method embodiment. Implementation principles and technical effects of the communication apparatus are similar to those of the method embodiment, and details are not described herein again.

An embodiment of this application further provides a computer-readable storage medium. The computer-readable storage medium stores computer instructions used to implement the method performed by the network device or the method performed by the terminal device in the foregoing method embodiment.

For example, when the computer instructions are executed, the communication apparatus can implement the method performed by the network device or the method performed by the terminal device in the foregoing method embodiments.

An embodiment of this application further provides a computer program product including instructions. When the instructions are executed, a computer is enabled to implement the method performed by the network device or the method performed by the terminal device in the foregoing method embodiments.

An embodiment of this application further provides a communication system. The communication system includes the terminal device and the network device in the foregoing embodiments.

In an example, the communication system includes the network device and the terminal device in the embodiment described above with reference to FIG. 5.

In an example, the communication system includes the network device and the terminal device in the embodiment described above with reference to FIG. 8.

In an example, the communication system includes the communication apparatus described above with reference to FIG. 9 and the communication apparatus described above with reference to FIG. 10.

In another example, the communication system includes the communication apparatus described above with reference to FIG. 11 or FIG. 12.

All or some of the foregoing embodiments may be implemented through software, hardware, firmware, or any combination thereof. When software is used to implement embodiments, embodiments may be implemented completely or partially in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape) an optical medium (for example, a DVD), a semiconductor medium (for example, a solid-state drive (SSD)), or the like.

The term "a plurality of" in this specification means two or more than two. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects. In the formula, the character "/" indicates a "division" relationship between the associated objects.

It may be understood that numerical symbols in embodiments of this application are differentiated merely for ease of description, but are not used to limit the scope of embodiments of this application.

It should be understood that sequence numbers of the foregoing processes do not mean execution sequences in embodiments of this application. The execution sequences of the processes should be determined according to functions and internal logic of the processes, and should not be construed as any limitation on the implementation processes of embodiments of this application.

What is claimed is:

1. A communication method, wherein the method comprises:

sending first indication information to a terminal device, wherein the first indication information is used to configure a candidate spatial parameter information set of a first uplink channel; and sending second indication information to the terminal device, wherein the second indication information is carried in a first media access control control element (MAC CE) and indicates at least one piece of first spatial parameter information in the candidate spatial parameter information set, wherein the at least one piece of first spatial parameter information is used for transmitting a second uplink channel; and receiving the second uplink channel transmitted according to the at least one piece of first spatial parameter information, wherein the first uplink channel and the second uplink channel are of different types, wherein a logical channel identifier of the first MAC CE is same as a logical channel identifier of a preset MAC CE but the first MAC CE and the preset MAC CE have different formats, and wherein each of the first MAC CE and the preset MAC CE comprise a first field, and the first field indicates whether the MAC CE to which the first field belongs is the first MAC CE or the preset MAC CE, and wherein at least one piece of the first spatial parameter information is indicated by reusing an information element in RRC signaling or a field in the first MAC CE.

2. The method according to claim 1, wherein the second indication information further indicates to the terminal device to transmit the first uplink channel by using the at least one piece of first spatial parameter information.

3. The method according to claim 1, wherein the preset MAC CE indicates second spatial parameter information, and the second spatial parameter information is used to transmit an uplink signal on the second uplink channel.

4. A communication method, wherein the method comprises:

receiving first indication information, wherein the first indication information is used to configure a candidate spatial parameter information set of a first uplink channel; and receiving second indication information, wherein the second indication information is carried in a first media access control control element (MAC CE) and indicates at least one piece of first spatial parameter information in the candidate spatial parameter information set;

transmitting a second uplink channel according to the at least one piece of first spatial parameter information wherein the first uplink channel and the second uplink channel are of different types, wherein a logical channel identifier of the first MAC CE is same as a logical channel identifier of a preset MAC CE but the first MAC CE and the preset MAC CE have different formats, and wherein each of the first MAC CE and the preset MAC CE comprise a first field, and the first field indicates whether the MAC CE to which the first field belongs is the first MAC CE or the preset MAC CE, and wherein at least one piece of the first spatial parameter information is indicated by reusing an information element in RRC signaling or a field in the first MAC CE.

5. The method according to claim 4, wherein the second indication information further indicates to transmit the first uplink channel by using the at least one piece of first spatial parameter information.

6. A communication apparatus, wherein the communication apparatus comprises a processor and a memory, wherein the memory is configured to store computer-executable program code, and the program code comprises instructions; and when the processor executes the instructions, the instructions enable the communication apparatus to:

send first indication information to a terminal device, wherein the first indication information is used to configure a candidate spatial parameter information set of a first uplink channel; and send second indication information to a terminal device, wherein the second indication information is carried in a first media access control control element (MAC CE) and indicates at least one piece of first spatial parameter information in the candidate spatial parameter information set, wherein the at least one piece of first spatial parameter information is used for transmitting a second uplink channel;

receive a second uplink channel transmitted according to the at least one piece of first spatial parameter information, wherein the first uplink channel and the second uplink channel are of different types, wherein a logical channel identifier of the first MAC CE is same as a logical channel identifier of a preset MAC CE but the first MAC CE and the preset MAC CE have different formats, and wherein each of the first MAC CE and the preset MAC CE comprise a first field, and the first field indicates whether the MAC CE to which the first field belongs is the first MAC CE or the preset MAC CE, and wherein at least one piece of the first spatial parameter information is indicated by reusing an information element in RRC signaling or a field in the first MAC CE.

7. The apparatus according to claim 6, wherein the second indication information further indicates to transmit the first uplink channel by using the at least one piece of first spatial parameter information.

8. The apparatus according to claim 6, wherein the preset MAC CE indicates second spatial parameter information, and the second spatial parameter information is used to transmit the uplink signal.

9. A communication apparatus, wherein the communication apparatus comprises a processor, a memory, a transmitter, and a receiver, wherein both the receiver and the transmitter are coupled to the processor, and the processor controls a receiving action of the receiver and controls a sending action of the transmitter;

the memory is configured to store computer-executable program code, and the program code comprises instructions; and when the processor executes the instructions, the instructions enable the communication apparatus to perform:

receive first indication information, wherein the first indication information is carried in a first media access control control element (MAC CE) and is used to configure a candidate spatial parameter information set of a first uplink channel;

receive second indication information, wherein the second indication information indicates at least one piece of first spatial parameter information in the candidate spatial parameter information set; wherein the at least one piece of first spatial parameter information is used for transmitting a second uplink channel; and transmit a second uplink channel according to the at least one piece of first spatial parameter information, wherein the first uplink channel and the second uplink channel are of different types, wherein a logical channel identifier of the first MAC CE is same as a logical channel identifier of a preset MAC CE but the first MAC CE and the preset MAC CE have different formats, and wherein each of the first MAC CE and the preset MAC CE comprise a first field, and the first field indicates whether the MAC CE to which the first field belongs is the first MAC CE or the preset MAC CE, and wherein at least one piece of the first spatial parameter information is indicated by reusing an information element in RRC signaling or a field in the first MAC CE.

10. The apparatus according to claim 9, wherein the second indication information further indicates to transmit the first uplink channel by using the at least one piece of first spatial parameter information.

* * * * *